(12) United States Patent
Mitsuoka et al.

(10) Patent No.: US 12,097,790 B2
(45) Date of Patent: Sep. 24, 2024

(54) SEAT DEVICE

(71) Applicant: TOYOTA BOSHOKU KABUSHIKI KAISHA, Aichi-ken (JP)

(72) Inventors: Naoki Mitsuoka, Aichi-ken (JP); Yukinori Sugiura, Aichi-ken (JP); Takashi Sakaguchi, Aichi-ken (JP); Takayuki Saitou, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/725,173

(22) Filed: Apr. 20, 2022

(65) Prior Publication Data
US 2022/0340060 A1 Oct. 27, 2022

(30) Foreign Application Priority Data

Apr. 23, 2021 (JP) .................................. 2021-073143

(51) Int. Cl.
*B60R 21/207* (2006.01)
*B60N 2/58* (2006.01)
(Continued)

(52) U.S. Cl.
CPC ............. *B60N 2/72* (2013.01); *B60N 2/5883* (2013.01); *B60N 2/686* (2013.01)

(58) Field of Classification Search
CPC ............ B60R 21/207; B60N 2/58; B60N 2/70
See application file for complete search history.

(56) References Cited

U.S. PATENT DOCUMENTS 1,947,130 A * 2/1934 Johnson ................ F16B 5/0642
24/295
2,576,343 A * 11/1951 Hibbard ................... B60N 2/34
297/65
(Continued)

FOREIGN PATENT DOCUMENTS

CN 105711462 6/2016
CN 110446442 11/2019
(Continued)

OTHER PUBLICATIONS

China Office Action issued in China Patent Application No. 202210422667.5, dated Mar. 27, 2023, together with English translation thereof.
(Continued)

*Primary Examiner* — Shin H Kim
(74) *Attorney, Agent, or Firm* — GREENBLUM & BERNSTEIN, P.L.C.

(57) ABSTRACT

A seat device includes a cushion portion configured to elastically support a seated person, and a seat frame configured to support the cushion portion. The cushion portion includes a plurality of divided cushions divided in a seat width direction. Each of the plurality of divided cushions includes a seat pad, and a seat cover individually covering the seat pad. A divided surface between the divided cushions adjacent to each other includes a first divided surface extending from a seat front side toward a seat back side, and a second divided surface that is bent from a seat back side extending tip of the first divided surface in a direction different from a direction in which the first divided surface extends and extends toward the seat back side.

11 Claims, 17 Drawing Sheets

(51) Int. Cl.
 B60N 2/72 (2006.01)
 B60R 21/2155 (2011.01)
 B60N 2/68 (2006.01)

(56) References Cited

U.S. PATENT DOCUMENTS

| | | | | |
|---|---|---|---|---|
| 4,789,201 | A * | 12/1988 | Selbert | B60N 2/5825 297/452.59 |
| 5,758,924 | A * | 6/1998 | Vishey | B60N 2/68 297/284.6 |
| 7,481,489 | B2 * | 1/2009 | Demick | B60N 2/5825 297/218.1 |
| 8,240,759 | B2 * | 8/2012 | Hobl | B60N 2/5825 297/452.59 |
| 8,388,062 | B2 * | 3/2013 | Hennig | B60N 2/5883 297/218.3 |
| 9,365,143 | B2 * | 6/2016 | Sachs | A47C 7/18 |
| 9,914,421 | B2 * | 3/2018 | Line | B60R 21/231 |
| 2009/0315373 | A1 * | 12/2009 | Thomas | B60R 21/207 297/216.13 |
| 2016/0144756 | A1 | 5/2016 | Ito et al. | |
| 2016/0159307 | A1 * | 6/2016 | Fujiwara | B60R 21/013 280/729 |
| 2016/0176328 | A1 | 6/2016 | Takahashi et al. | |
| 2017/0259770 | A1 * | 9/2017 | Fujiwara | B60R 21/0134 |
| 2017/0349133 | A1 * | 12/2017 | Line | B60R 21/215 |
| 2017/0368976 | A1 | 12/2017 | Matsushima | |
| 2019/0023217 | A1 * | 1/2019 | Ohno | B60R 21/23138 |
| 2020/0047649 | A1 | 2/2020 | Takahashi et al. | |
| 2020/0070699 | A1 | 3/2020 | Kakishima et al. | |
| 2020/0189515 | A1 * | 6/2020 | Kobayashi | B60R 21/23138 |
| 2020/0346611 | A1 * | 11/2020 | Kobayashi | B60R 21/261 |
| 2021/0354649 | A1 * | 11/2021 | Sakurai | B60R 21/233 |
| 2022/0227326 | A1 * | 7/2022 | Kobayashi | B60N 2/58 |
| 2022/0340059 | A1 * | 10/2022 | Mitsuoka | B60N 2/686 |

FOREIGN PATENT DOCUMENTS

| | | |
|---|---|---|
| JP | 59-070548 | 5/1984 |
| JP | 05-046588 | 6/1993 |
| JP | 08-242977 | 9/1996 |
| JP | 9-109740 | 4/1997 |
| JP | 09-254685 | 9/1997 |
| JP | 2009-189600 | 8/2009 |
| JP | 2012-232701 | 11/2012 |
| JP | 2012-254719 | 12/2012 |
| JP | 2014-108741 | 6/2014 |
| JP | 6046816 | 12/2016 |
| JP | 2018-1799 | 1/2018 |
| JP | 2020-33005 A | 3/2020 |

OTHER PUBLICATIONS

Japan Office Action issued in Japan Patent Application No. 2021-73143, dated Mar. 12, 2024, together with English translation thereof.

* cited by examiner

SEAT DEVICE

CROSS REFERENCE TO RELATED APPLICATIONS

This application is based on Japanese Patent Applications No. 2021-073143 filed on Apr. 23, 2021, the entire contents of which are incorporated herein by reference.

BACKGROUND

The present invention relates to a seat device. More specifically, the present invention relates to a seat device including a cushion portion that elastically supports a seated person, and a seat frame that supports the cushion portion.

In a vehicle seat device, there is known a configuration in which a cushion portion including a seat pad and a seat cover includes a plurality of divided cushions divided in a seat width direction (JP-A-2020-33005). Each of the divided cushions is configured to be individually bolted and fixed to a seat frame.

In the above seat device, a divided surface of each divided cushion has a shape extending straight from a seat front side to a seat back side. Therefore, when a foreign object enters space between the divided cushions, the foreign object easily enters deep toward the seat back side. Therefore, the present invention provides a seat device in which a foreign object is less likely to enter deep from between divided cushions.

In order to solve the above problem, the seat device of the present invention has the following aspects.

SUMMARY OF INVENTION

According to an aspect of the present disclosure, a seat device includes a cushion portion configured to elastically support a seated person, and a seat frame configured to support the cushion portion. The cushion portion includes a plurality of divided cushions divided in a seat width direction. Each of the plurality of divided cushions includes a seat pad, and a seat cover individually covering the seat pad. A divided surface between the divided cushions adjacent to each other includes a first divided surface extending from a seat front side toward a seat back side, and a second divided surface that is bent from a seat back side extending tip of the first divided surface in a direction different from a direction in which the first divided surface extends and extends toward the seat back side.

According to the above configuration, even when a foreign object enters space between the divided cushions adjacent to each other, the foreign object is easily restricted from entering deep by the bent shape between the first divided surface and the second divided surface. Therefore, it can be difficult for the foreign object to enter deep between the divided cushions.

In addition, the seat device of the present invention may be further configured as follows. The plurality of divided cushions includes three divided elements composed of a top main portion that forms a central portion in the seat width direction, and top side portions that form two side portions in the seat width direction of the seat device. The three divided elements may form a seat back. The three divided elements may form a seat cushion.

According to the above configuration, since dividing lines of the divided cushions are provided between the top main portion and the top side portions located on both sides of the top main portion, the cushion portion can be appropriately divided in the seat width direction in such a manner that sitting comfort is not impaired.

In addition, the seat device of the present invention may be further configured as follows. The first divided surface extends in a direction that rises in a thickness direction relative to the second divided surface, and the second divided surface is bent obliquely inward in the seat width direction.

According to the above configuration, the top side portions support the top main portion from the seat back side. In addition, even if the top main portion is set between the top side portions after the top side portions are set on the seat frame, assembly thereof is less likely to be hindered.

In addition, the seat device of the present invention may be further configured as follows. The seat pad of each top side portion is made of urethane foam that is harder than the seat pad of the top main portion.

According to the above configuration, side support provided for the seated person can be improved by the hardness of the top side portions. In addition, the effect of restricting entry of the foreign object can be improved by the hardness of the top side portions.

In addition, the seat device of the present invention may be further configured as follows. A top cover piece of the seat cover that is disposed over a seat surface includes an extension portion that extends so as to cover the divided surface, and a sewn portion where the top cover piece is sewn with a divided surface cover piece disposed on the divided surface.

According to the above configuration, since the sewn portion of the seat cover is provided on the divided surface separated from the seat surface, the sitting comfort and appearance quality of the seat device can be less likely to be impaired.

DESCRIPTION OF EMBODIMENTS

Figure 1:
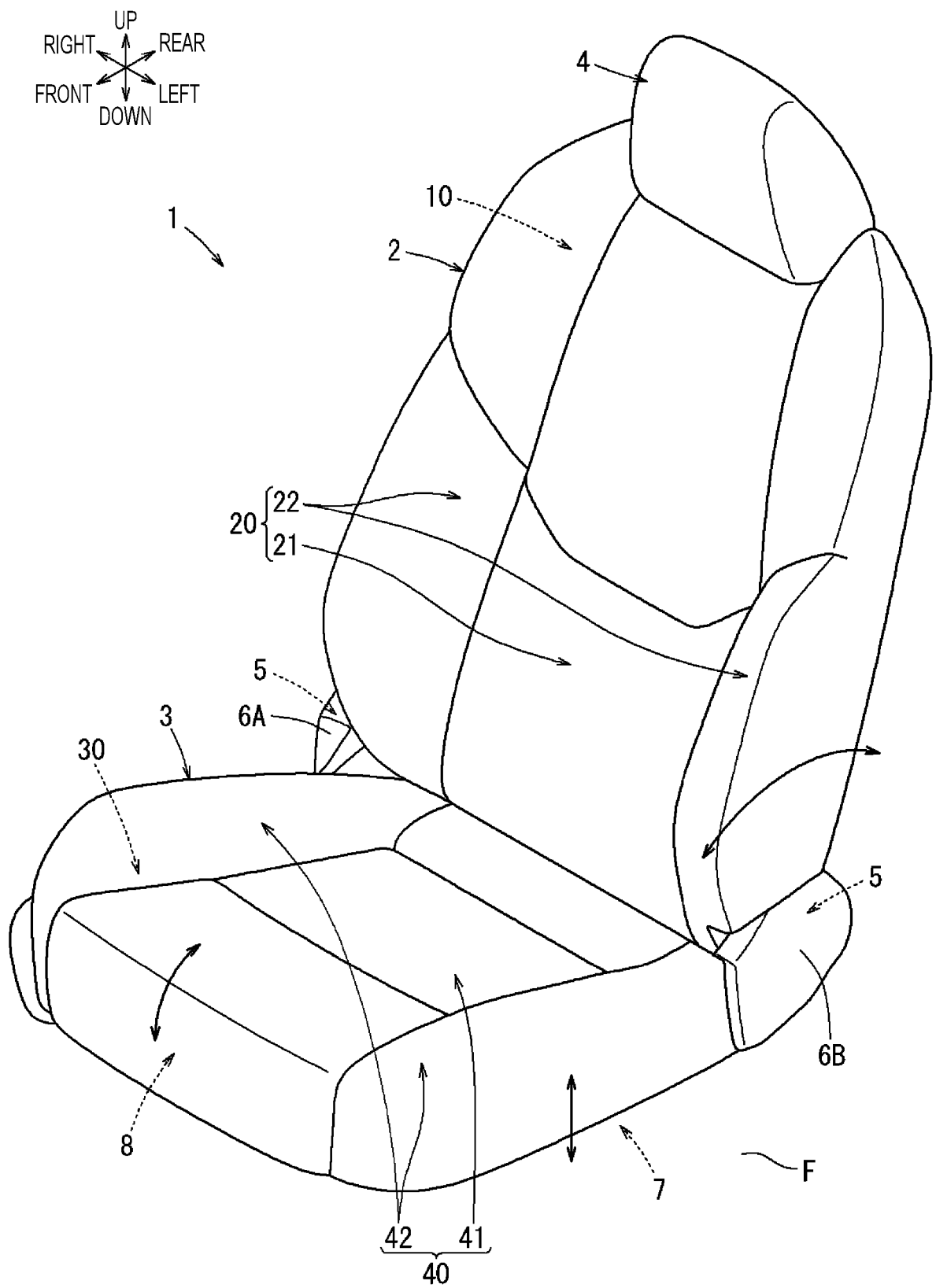
FIG. 1 is a perspective view showing a schematic configuration of a seat device according to a first embodiment.

Hereinafter, embodiments of the present invention will be described with reference to the drawings.

First Embodiment (Schematic Configuration of Seat Device 1)

First, a configuration of a seat device 1 according to a first embodiment of the present invention will be described with reference to FIGS. 1 to 17. In the following description, directions such as front, rear, up, down, left, and right indicate the respective directions shown in the drawings. In addition, in a case where "seat" is attached to each direction, such as "seat width direction", such a direction indicates a direction based on a direction of the seat device 1 described later. In addition, in the following description, when a specific reference diagram is not shown, or when there is no reference numeral corresponding to the reference diagram, any one of FIGS. 1 to 17 is appropriately referred to.

As shown in FIG. 1, the seat device 1 according to the present embodiment is configured as a one-person right seat installed on a floor F of an automobile. The seat device 1 includes a seat back 2 that forms a backrest of a seated person, a seat cushion 3 that forms a seating portion, and a headrest 4 that forms a headrest.

Lower end portions on both left and right sides of the seat back 2 are connected to rear end portions on both left and right sides of the seat cushion 3 via an electric reclining mechanism 5, respectively. As a result, the seatback 2 is configured to be capable of freely adjusting a backrest angle relative to the seat cushion 3 in a seat front-rear direction in accordance with an operation of each reclining mechanism 5.

Side shields 6A and 6B, which are made of resin, respectively cover each connection portion between the seat back 2 and the seat cushion 3 from a seat width direction outer side. The right side shield 6A extends longer forward than the left side shield 6B and covers a right side portion of the seat cushion 3.

Both left and right side portions of the seat cushion 3 are connected to the floor F via an electric lifter mechanism 7, respectively. As a result, the seat cushion 3 is configured to be capable of freely adjusting a height relative to the floor F in accordance with an operation of each lifter mechanism 7. The seat cushion 3 includes a tilt mechanism 8 capable of adjusting a seating surface angle of a front portion thereof.

The seat back 2 and the seat cushion 3 are configured in such a manner that cushion portions 20 and 40, which elastically support a load of the seated person, are each formed of three divided elements divided into three in the seat width direction. Specifically, the seat back 2 is configured in such a manner that the cushion portion 20, which elastically supports a back of the seated person, is formed of three divided elements, namely a top main portion 21 that forms a central portion in the seat width direction, and top side portions 22 that form both side portions in the seat width direction. Here, the top main portion 21 and the top side portions 22 each correspond to a "divided cushion" of the present invention.

The top main portion 21 is configured in such a manner that a seat surface in contact with the back of the seated person has a relatively flat surface shape facing forward, and is capable of elastically supporting the back of the seated person straight from behind. A seat surface of each top side portion 22, which is in contact with the back of the seated person, has a bank-like protruding shape that protrudes obliquely forward from an inner side toward an outer side in the seat width direction. As a result, each top side portion 22 is configured to be capable of elastically supporting the back of the seated person from a diagonally rear outer side in the seat width direction.

Similarly, the seat cushion 3 is configured in such a manner that the cushion portion 40, which elastically supports buttocks of the seated person, is formed of three divided elements, namely a top main portion 21 that forms a central portion in the seat width direction and top side portions 42 that form both side portions in the seat width direction. Here, the top main portion 41 and the top side portions 42 each correspond to the "divided cushion" of the present invention.

The top main portion 21 is configured in such a manner that a seat surface in contact with the buttocks of the seated person has a relatively flat surface shape facing upward and elastically supports the buttocks of the seated person straight from below. A seat surface of each top side portion 42, which is in contact with the buttocks of the seated person, has a bank-like protruding shape that protrudes obliquely upward from the inner side toward the outer side in the seat width direction. As a result, each top side portion 42 is configured to elastically support the buttocks of the seated person from a diagonally lower outer side in the seat width direction.

The cushion portion 20 of the seat back 2 is configured in such a manner that the top main portion 21 and the top side portions 22 thereof are easily assembled to a back frame 10, which forms a framework of the seat back 2, only by access from the front (see FIGS. 2 to 8). Similarly, the cushion portion 40 of the seat cushion 3 is also configured in such a manner that the top main portion 41 and the top side portions 42 thereof are easily assembled to a cushion frame 30, which forms a framework of the seat cushion 3, only by access from above (see FIGS. 9 to 16).

The seat device 1 is configured in such a manner that the cushion portion 20 of the seat back 2 and the cushion portion 40 of the seat cushion 3 can be appropriately fixed to the back frame 10 and the cushion frame 30 even with the above-described assembly structure. Hereinafter, specific configurations of each portion of the seat back 2 and the seat cushion 3 will be described in detail. Here, the back frame 10 and the cushion frame 30 each correspond to a "seat frame" of the present invention.

(Seat Back 2)

Figure 2:
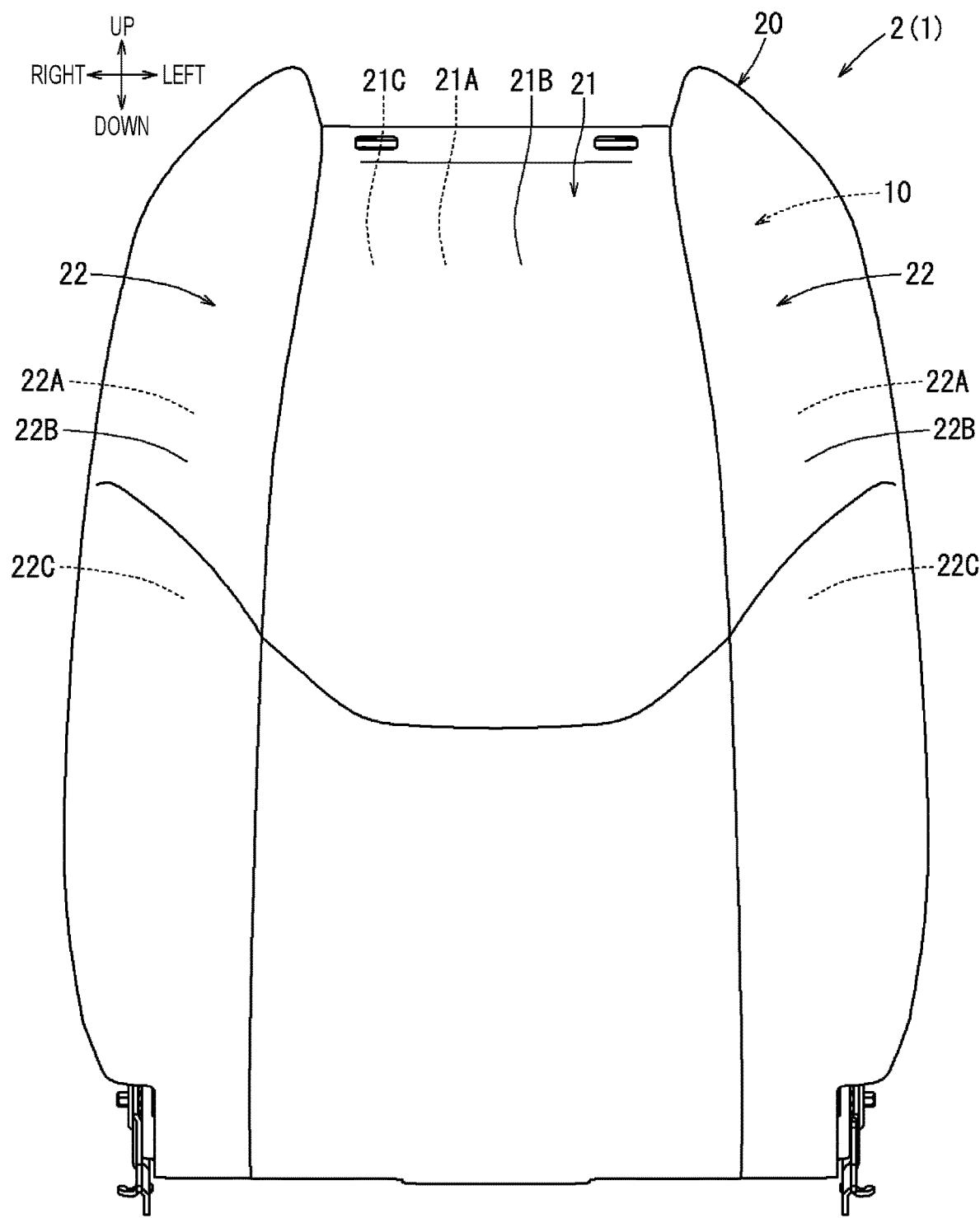
FIG. 2 is a front view of a seat back.
Figure 3:
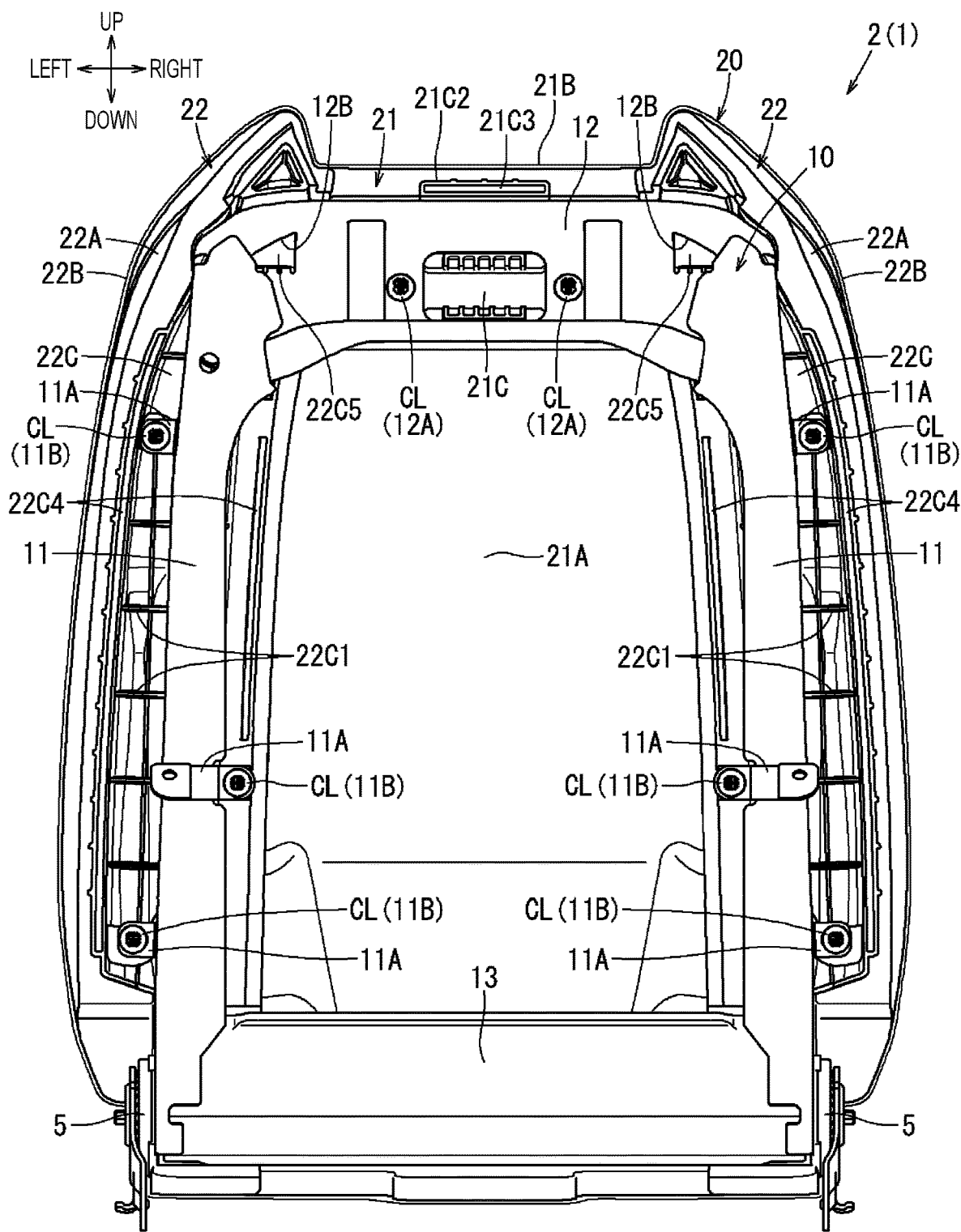
FIG. 3 is a rear view of the seat back.

First, a configuration of the seat back 2 will be described with reference to FIGS. 2 to 8. As shown in FIGS. 2 and 3, the seat back 2 includes the metal back frame 10 that forms an internal framework thereof, and the cushion portion 20 that is assembled to the back frame 10 and elastically supports the load of the seated person.

Figure 4:
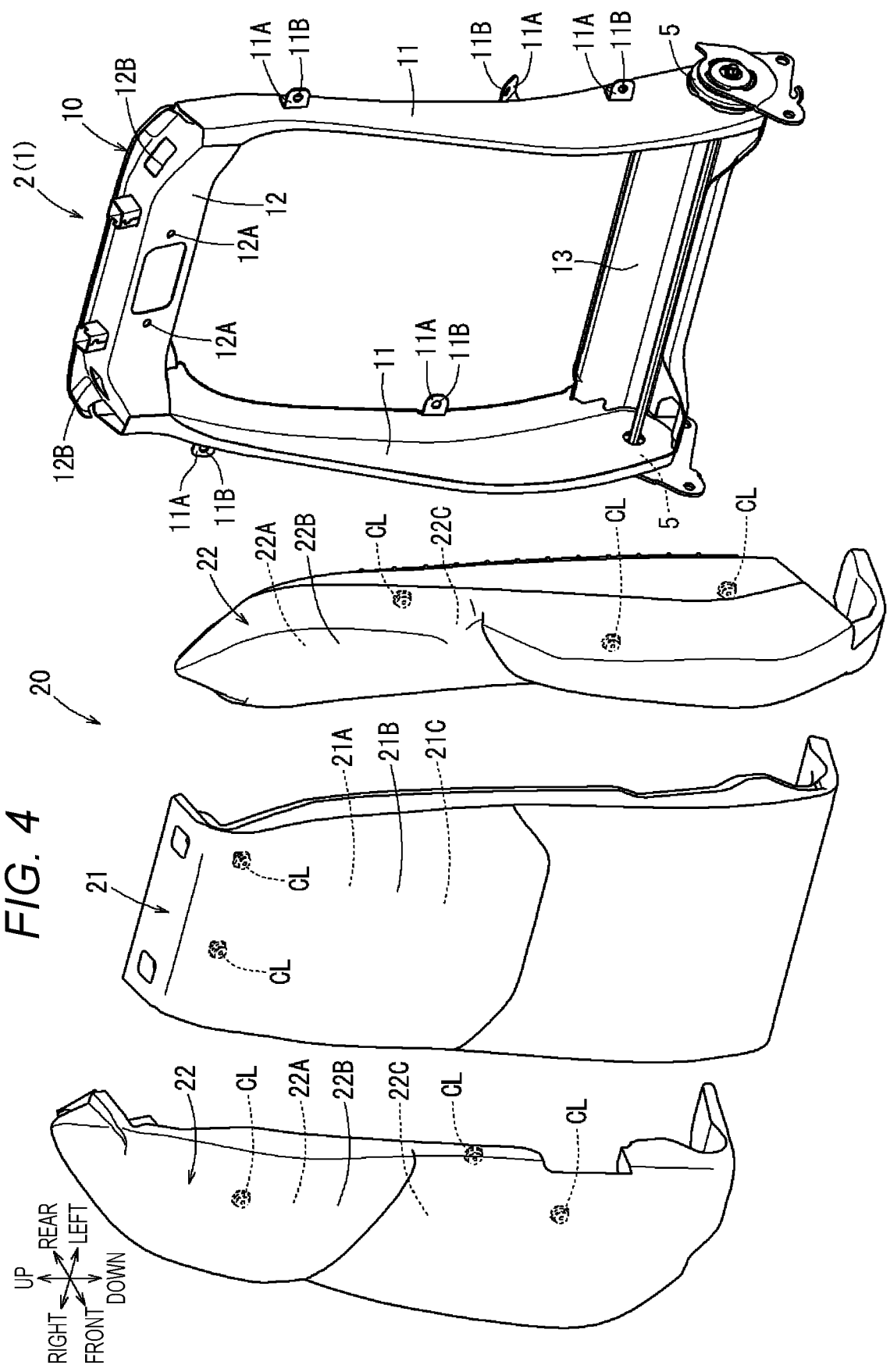
FIG. 4 is an exploded perspective view of the seat back.
Figure 5:
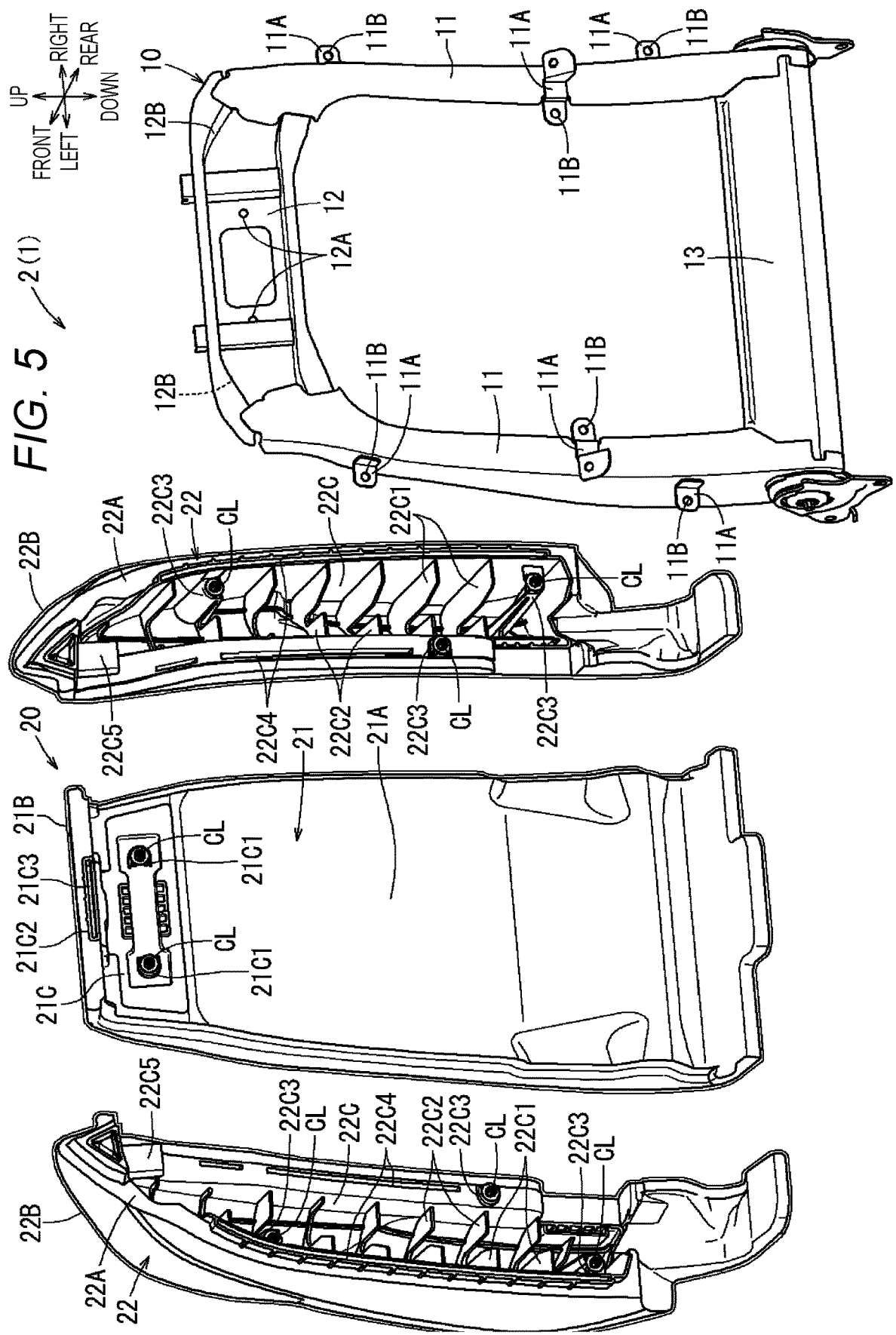
FIG. 5 is an exploded perspective view of FIG. 4 as viewed from a back surface side.

Although not shown in the drawings, the seat back 2 also includes a resin back board that covers a back surface thereof. As shown in FIGS. 4 and 5, the back frame 10 is configured to be assembled in a vertically long frame shape in a front view.

Specifically, the back frame 10 includes a pair of left and right side frames 11 that form a vertically long framework along left and right side portions of the seat back 2. The back frame 10 also includes an upper frame 12 that forms a laterally long framework along an upper side portion of the seat back 2. The back frame 10 also includes a lower frame 13 that forms a laterally long framework along a lower side portion of the seat back 2.

Each of the side frames 11 is formed of a metal plate press-formed product formed in a shape elongated in a height direction. The side frames 11 are arranged to face each other in the seat width direction. A front edge and a rear edge of each of the side frames 11 are bent inward in the seat width direction so as to form a frame shape whose cross section is U-shaped.

The upper frame 12 is formed of a metal plate press-formed product formed in a shape elongated in the seat width direction. The upper frame 12 has a frame shape that is opened rearward and has a U-shaped cross section. The upper frame 12 is bridged between upper end portions of the side frames 11 and integrally welded thereto.

The lower frame 13 is formed of a metal plate press-formed product formed in a shape elongated in the seat width direction. A lower end portion of the lower frame 13 is curved forward so as to form a frame shape whose cross-section is J-shaped. The lower frame 13 is bridged between lower end portions of the side frames 11 and integrally welded thereto. Specifically, the lower frame 13 is welded across a flange portion, which is bent inward in the seat width direction, of a lower rear edge of each side frame 11, and a flange portion, which is bent inward in the seat width direction, of a lower front edge of each side frame 11.

The cushion portion 20 includes the three divided elements, namely the top main portion 21 that forms a cushion structure of the central portion of the seat back 2 in the seat width direction, and the top side portions 22 that form cushion structures of the both side portions of the seat back 2 in the seat width direction. The top main portion 21 and the top side portions 22 are configured to be completely separated from each other, and are configured to be individually assembled and fixed to the back frame 10 from the front.

(Top Main Portion 21)

Figure 6:
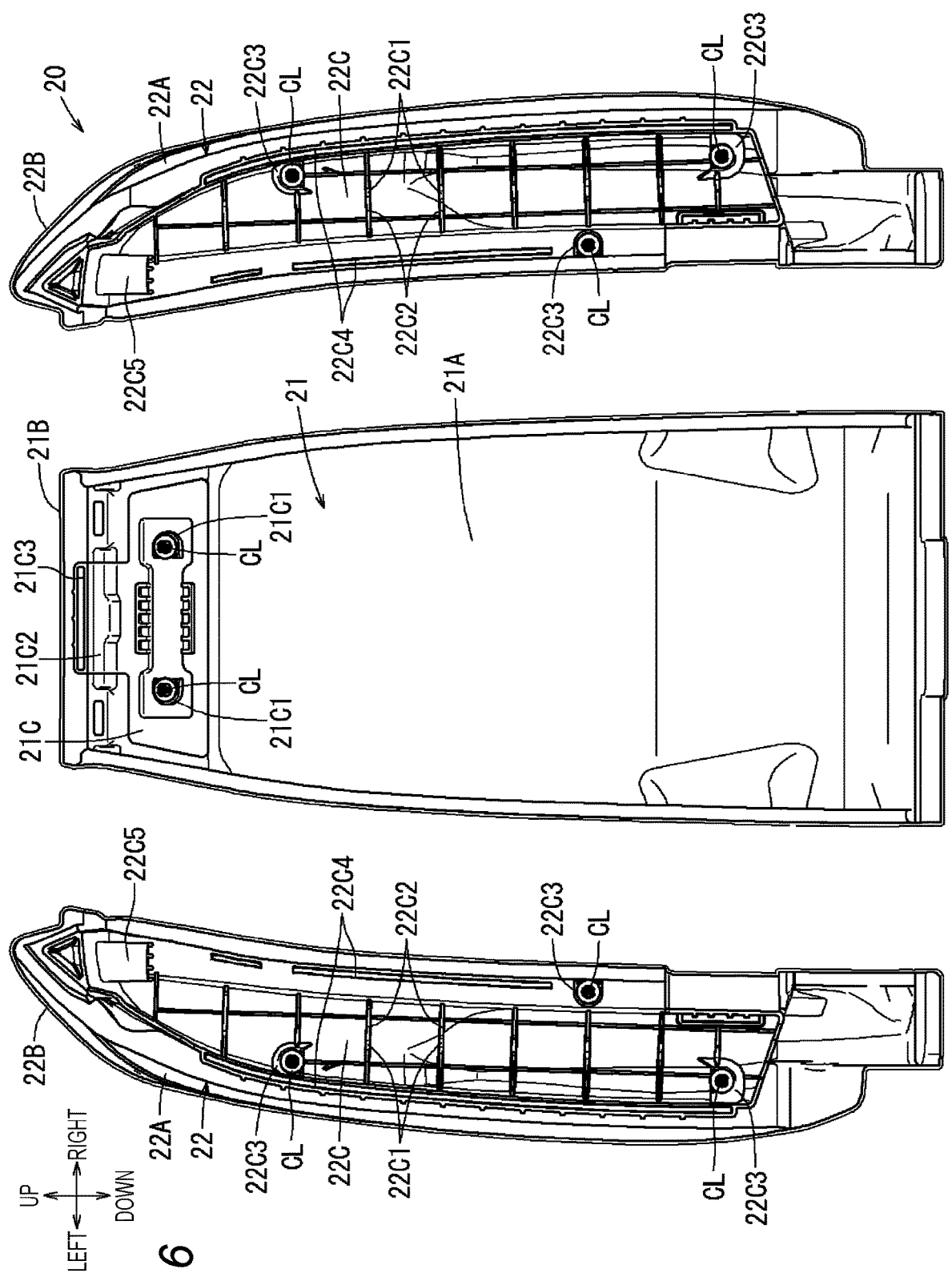
FIG. 6 is a rear view of a cushion portion of the seat back.
Figure 7:
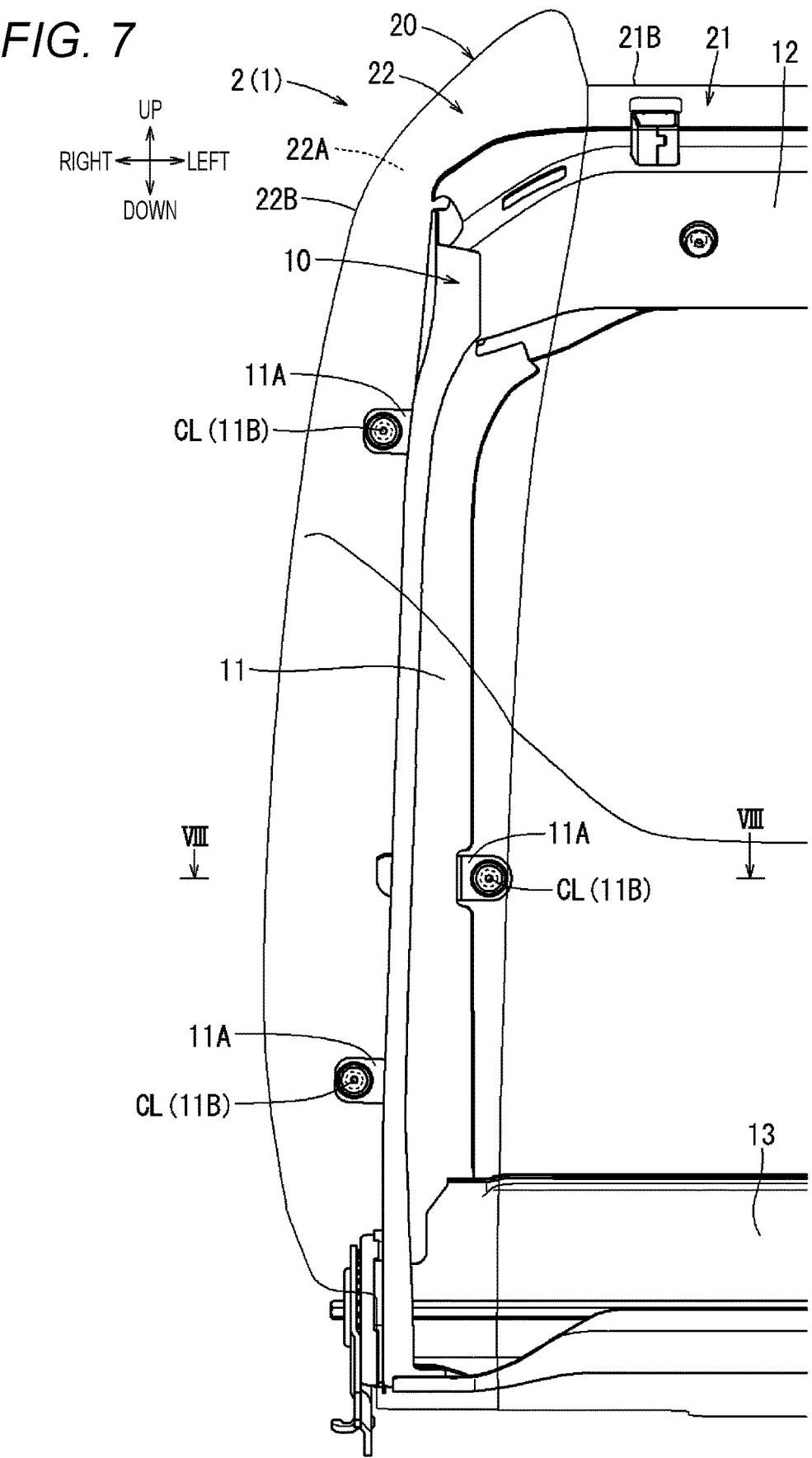
FIG. 7 is a front view showing an interior of the seat back in a visualized manner.

As shown in FIGS. 3, 5, and 6, the top main portion 21 includes a main pad 21A that is made of urethane foam, and a main cover 21B that is made of fabric and covers an entire surface of the main pad 21A. The top main portion 21 also includes a main panel 21C that is made of resin and provided in a stacked manner along a back surface (rear surface) of an upper portion of the main pad 21A.

Here, the main pad 21A corresponds to a "seat pad" of the present invention. In addition, the main cover 21B corresponds to a "seat cover" of the present invention. In FIGS. 3, 5, and 6, only an outline of the main cover 21B is shown by thin lines, and an internal structure covered by the main cover 21B is shown in a visualized manner.

The main pad 21A is set to be covered from the front across the upper frame 12 and the lower frame 13 of the back frame 10, and is formed in a pad shape that is elongated in the height direction. More specifically, the main pad 21A is formed in a wide pad shape that can cover an in-frame region between the side frames 11 of the back frame 10 from the front over most of the region in the seat width direction.

In addition, the main pad 21A has a shape whose upper edge portion and whose lower edge portion extend rearward in an eaves-like protruding shape. The main pad 21A is configured in such a manner that the upper edge portion and the lower edge portion thereof, which protrude rearward, also cover a top of the upper frame 12 and a bottom of the lower frame 13 from the front.

Figure 8:
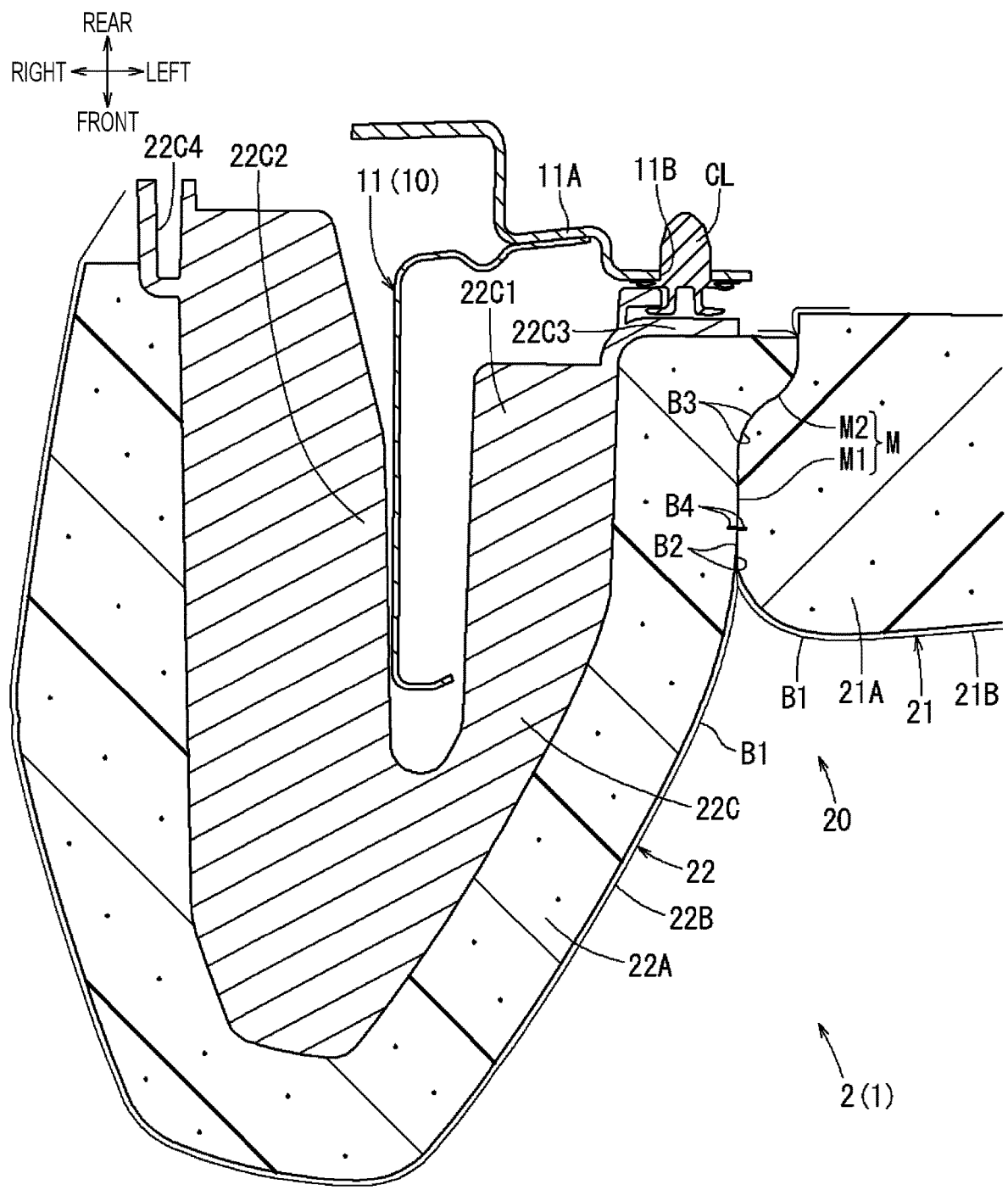
FIG. 8 is a cross-sectional view taken along line VIII-VIII of FIG. 7.

As shown in FIGS. 2 and 8, the main pad 21A is configured in such a manner that a seat surface in contact with the back of the seated person has a relatively flat surface shape facing forward, and is capable of elastically supporting the back of the seated person straight from behind. As a result, the main pad 21A is configured to be capable of elastically supporting the back of the seated person widely from behind in the in-frame region of the back frame 10.

With reference to FIG. 6, at the time of foam molding of the main pad 21A, the main panel 21C is set in a mold to perform the foam molding, and thus the main pad 21A is formed in a state of being integrally joined to the main panel 21C. The main panel 21C is provided in a stacked manner along the upper region of the main pad 21A, specifically, along the back surface (rear surface) of the upper region of the main pad 21A that covers the upper frame 12 from the front, as shown in FIG. 5.

As shown in FIGS. 5 and 6, attachment pedestals 21C1, which protrude rearward each in a pedestal shape, are formed at two positions, left and right, on a back surface of the main panel 21C. A clip CL, which is made of resin, is inserted into each attachment pedestal 21C1 from the seat width direction inner side and is integrally mounted thereto. As a result of the mounting, each clip CL is integrally fixed to each attachment pedestal 21C1 in a state where a tip end of each clip CL protrudes rearward from each attachment pedestal 21C1.

As shown in FIG. 5, when the top main portion 21 is assembled to the back frame 10, each clip CL is inserted from the front into each corresponding clip fitting hole 12A formed in a front portion of the upper frame 12. As a result, each clip CL is inserted into the respective clip fitting hole 12A of the upper frame 12 while being elastically deformed, and is hooked on a peripheral edge of the respective clip fitting hole 12A due to an elastic force caused by restoration so as to be integrally snap-fitted thereto.

As a result of the above snap-fitting, the main pad 21A is set in a state of covering from the front across the upper frame 12 and the lower frame 13. The main panel 21C is formed with an eaves portion 21C2 that protrudes rearward in an eaves shape along a central upper edge portion of the main panel 21C.

The eaves portion 21C2 has a plate shape that extends in the seat width direction so as to be flush with a lower surface of an upper edge portion, which protrudes rearward, of the main pad 21A. Each clip CL of the main panel 21C is inserted into the respective clip fitting hole 12A of the upper frame 12 from the front and assembled thereto, and thus the eaves portion 21C2 is set to ride on the top of the upper frame 12. As a result, the main panel 21C is configured such that a load in a gravity direction applied to the top main portion 21 is transmitted from the eaves portion 21C2 onto the top of the upper frame 12, and is supported by the upper frame 12 from below.

In the main panel 21C, cover fixing grooves 21C3 are formed in both left and right edges of the main panel 21C and a rear edge of the eaves portion 21C2, and each of the cover fixing grooves 21C3 is recessed in a streak shape extending along each edge. The cover fixing grooves 21C3 are each formed in a slit shape that is opened rearward, and serve as portions configured to fix ends, which are to be covered on an upper surface and left and right side surfaces of the main pad 21A, of the main cover 21B. Specifically, a resin plate (not shown) coupled along each end of the main cover 21B is inserted into each cover fixing groove 21C3 from behind, and thus each resin plate is hooked and fixed so as not to be pulled out rearward by tension caused by stretching of the main cover 21B.

The main cover 21B covers the entire surface of the main pad 21A from the front, and ends on upper, lower, left, and right peripheral edge sides thereof are drawn toward a seat back side (rear side) through upper, lower, left, and right peripheral surfaces of the main pad 21A. Ends, which are to be covered on the upper surface and the left and right side surfaces of the main pad 21A, of the main cover 21B are fixed to the cover fixing grooves 21C3 on the back side of the main panel 21C by the resin plate (not shown).

In addition, an end, which is to be covered on a lower surface of the main pad 21A, of the main cover 21B is fastened by hooking a J-hook (not shown) coupled to the same end into a hooking groove (not shown) formed in a seat back side portion (rear portion) of the lower frame 13. In addition, the ends, which are to be covered on the left and right side surfaces of the main pad 21A, of the main cover 21B is fastened by coupling to the back surface (rear surface) of the main pad 21A by a coupling tool such as a hook-and-loop fastener (not shown) at a portion where the resin plate (not shown) is not coupled.

(Top Side Portion 22)

As shown in FIGS. 3, 5, and 6, each top side portion 22 includes a side pad 22A that is made of urethane foam, and a side cover 22B that is made of fabric and covers an entire surface of the side pad 22A. Each top side portion 22 also includes a side panel 22C that is made of resin and provided in a stacked manner over a wide region in the height direction along a back surface (rear surface) of the side pad 22A.

Here, each side pad 22A corresponds to the "seat pad" of the present invention. In addition, each side cover 22B corresponds to the "seat cover" of the present invention. In FIGS. 3, 5, and 6, only an outline of each side cover 22B is shown by thin lines, and an internal structure covered by each side cover 22B is shown in a visualized manner.

Each side pad 22A is set to be covered from the front over an entire region in the height direction of each side frame 11 of the back frame 10, and is formed in a pad shape that is elongated in the height direction. Specifically, each side pad 22A has a pad shape that is set to be aligned side by side with the main pad 21A with a gap therebetween in the seat width direction.

Each side pad 22A has a shape whose upper edge portion and whose lower edge portion extend rearward in an eaves-like protruding shape. Each side pad 22A is configured in such a manner that the upper edge portion and the lower edge portion thereof, which protrude rearward, also cover the top of the upper frame 12 and the bottom of the lower frame 13 of the back frame 10 from the front.

In addition, each side pad 22A has a shape whose inner edge portion and whose outer edge portion in the seat width direction also extend rearward in eaves-like protruding shapes. Each side pad 22A is configured in such a manner that the inner edge portion and the outer edge portion thereof, which protrude rearward, also cover an inner side surface and an outer side surface of each side frame 11 in the seat width direction from the front.

As shown in FIGS. 2 and 8, a seat surface of each side pad 22A, which is in contact with the back of the seated person, is arranged side by side with the seat surface of the main pad 21A, and has a bank-like protruding shape that protrudes obliquely forward from the inner side toward the outer side in the seat width direction. As a result, each side pad 22A is configured to have a side support function capable of elastically supporting the back of the seated person from a diagonally rear outer side in the seat width direction.

With reference to FIG. 6, at the time of foam molding of the side pad 22A, each corresponding side panel 22C is set in a mold to perform the foam molding, and thus each side pad 22A is formed in a state of being integrally joined to each corresponding side panel 22C. As shown in FIG. 5, each side panel 22C is provided in a stacked manner along most of a back surface region in the height direction, which covers each side frame 11, of each side pad 22A.

Specifically, as shown in FIG. 8, each side panel 22C is provided in a shape that extends in the height direction and has a U-shaped cross section along a concave surface shape recessed in the back surface of each side pad 22A. The recessed shape in the back surface of each side pad 22A is a bank-like recessed shape conforming to the bank-like protruding seat surface shape of each side pad 22A.

Therefore, the bank-like protruding portion of each side pad 22A is strongly supported in a planar manner from the seat back side along each inclined surface of each bank by each side panel 22C that is provided in the stacked manner along the bank-like concave surface shape of each side pad 22A. As a result, each side pad 22A is strongly supported from the seat back side by each side panel 22C so that the bank-like protruding portion thereof is less likely to fall inward or outward in the seat width direction.

Specifically, since each side pad 22A is supported in the planar shape from the seat back side by each side panel 22C, the load received from the back of the seated person can be received while body pressure is widely distributed. For this reason, each top side portion 22 is capable of elastically supporting the back of the seated person with appropriate hardness from the diagonally rear outer side in the seat width direction. In addition, even if each top side portion 22 receives a force that pushes inward and outward in the seat width direction when the seated person gets on and off the seat device 1 from a lateral direction, the bank-like shape thereof is less likely to fall inward and outward in the seat width direction.

When being assembled to each side frame 11 from the front, each side panel 22C is set in a state where the U-shaped cross section thereof covers each side frame 11 from the front and from the inner and outer sides in the seat width direction. As shown in FIGS. 5 and 6, plate-like ribs 22C1 are formed side by side at intervals at a plurality of locations in the height direction on a back surface of each side panel 22C.

Each rib 22C1 is formed in a plate-like protruding shape inside the U shape of each side panel 22C. Specifically, each rib 22C1 is formed in a U-shaped plate-like protruding shape that is connected to an inner wall, a front wall, and an outer wall of the U-shaped cross section of each side panel 22C and is opened rearward.

With reference to FIG. 6, when each side panel 22C is assembled to each side frame 11 from the front, each rib 22C1 is set such that a front side portion of the U shape thereof faces a front edge portion of each side frame 11 from the front, that is, the flange portion on the front edge side bent inward in the seat width direction.

Then, an inner side portion (side abutment portion 22C2) of the U shape of each rib 22C1 is set to face an edge portion, which is to be bent, of the flange portion on the front edge side of each side frame 11 from the seat width direction inner side. Further, an outer side portion of the U shape of each rib 22C1 is set to face the outer side surface of each side frame 11. As a result of the above assembly, in a region where the ribs 22C1 are formed, each side panel 22C is capable of being abutted against each side frame 11 from the front and from the inner and outer sides in the seat width direction so as to transmit a load thereto.

As shown in FIGS. 5 and 6, attachment pedestals 22C3, which protrude rearward each in a pedestal shape, are formed at three positions in the height direction on the back surface of each side panel 22C. The clip CL, which is made of resin, is inserted into each attachment pedestal 22C3 from below, from above, or from the seat width direction inner side, and is integrally mounted thereto. As a result of the above mounting, each clip CL is integrally fixed to each attachment pedestal 22C3 in a state where a tip end of each clip CL protrudes rearward from each attachment pedestal 22C3.

As shown in FIG. 5, when each top side portion 22 is assembled to the back frame 10, each clip CL is inserted from the front into a clip fitting hole 11B of each corresponding bracket 11A coupled to each side frame 11. As a result, each clip CL is inserted into the clip fitting hole 11B of the respective bracket 11A while being elastically deformed, and is hooked on a peripheral edge of the respective clip fitting hole 11B due to an elastic force caused by restoration so as to be integrally snap-fitted thereto.

As a result of the above snap-fitting, each side pad 22A is set in a state of covering each corresponding side frame 11 from the front. Here, among the three attachment pedestals 22C3 arranged in the height direction of each side panel 22C, two attachment pedestals 22C3 arranged on an upper side and a lower side are respectively arranged on the outer side wall of the U-shaped cross section of each side panel 22C at positions outward of positions where the corresponding ribs 22C1 connected to the outer side wall are connected.

In addition, each attachment pedestal 22C3 that is disposed in the middle in the height direction is disposed at an inner position on a rear surface portion that extends inward in the seat width direction from a rear edge of the inner side wall of the U-shaped cross section of each side panel 22C. In this way, the attachment pedestals 22C3 have a staggered arrangement in which the one attachment pedestal 22C3 in the middle is offset inward in the seat width direction relative to the two attachment pedestals 22C3 on the upper and lower sides. Accordingly, the clips CL that are mounted to the respective attachment pedestals 22C3 are also arranged in a staggered manner so as to be offset in the seat width direction.

Cover fixing grooves 22C4 are formed in the rear edge of the inner side wall and a rear edge of the outer side wall of the U-shaped cross section of each side panel 22C, and each of the cover fixing grooves 22C4 is recessed in a streak shape extending along each edge. The cover fixing grooves 22C4 are each formed in a slit shape that is opened rearward, and serve as portions configured to fix ends, which are to be covered on left and right side surfaces of each side pad 22A, of each side cover 22B. Specifically, a resin plate (not shown) coupled along each end of each side cover 22B is inserted into each cover fixing groove 22C4 from behind, and thus each resin plate is hooked and fixed so as not to be pulled out rearward by tension caused by stretching of each side cover 22B.

As shown in FIG. 5, each side panel 22C is formed with a boss 22C5 that protrudes downward in a pedestal shape on an upper wall portion protruding rearward in an eaves-like shape along an upper edge portion of each side pad 22A. When each top side portion 22 is assembled to the back frame 10, each boss 22C5 serves as a portion that is inserted from above and fitted into each corresponding boss hole 12B formed in left and right end portions of the top of the upper frame 12.

As a result of the above fitting, the upper wall portions of the side panels 22C are set in a state of being abutted against the upper frame 12 in the front, rear, left, and right directions so as to be restricted from moving. Therefore, after each boss 22C5 is inserted into each boss hole 12B of the upper frame 12 from above, each clip CL are inserted into the clip fitting hole 11B of each corresponding bracket 11A from the front and snap-fitted thereto, so that each boss 22C5 is fixed so as not to be pulled out upward from each boss hole 12B of the upper frame 12.

Each side cover 22B covers the entire surface of each corresponding side pad 22A from the front, and ends on upper, lower, left, and right peripheral edge sides thereof are drawn toward the seat back side (rear side) through upper, lower, left, and right peripheral surfaces of each corresponding side pad 22A. Ends, which are to be covered on the left and right side surfaces of each side pad 22A, of each side cover 22B are fixed to the cover fixing grooves 22C4 on the back side of each corresponding side panel 22C by the resin plate (not shown).

In addition, an end, which is to be covered on an upper surface of each side pad 22A, of each side cover 22B is fastened by hooking a J-hook (not shown) coupled to the same end on a hook portion (not shown) coupled to a seat back side portion (rear portion) of the upper frame 12. In addition, an end, which is to be covered on a lower surface of each side pad 22A, of each side cover 22B is fastened by hooking a J-hook (not shown) coupled to the same end on a hook portion (not shown) coupled to a seat back side portion (rear portion) of the lower frame 13.

(Assembly of Top Main Portion 21 and Each Top Side Portion 22)

The top main portion 21 and the top side portions 22 constituting the cushion portion 20 are assembled to the back frame 10 from the front by the following procedure. First, each top side portion 22 of the cushion portion 20 is assembled to the back frame 10 in order from the front earlier than the top main portion 21.

Each top side portion 22 is assembled to the back frame 10 in a modularized state where each side pad 22A is covered with each corresponding side cover 22B, and the resin plate (not shown) coupled to the end of each side cover 22B is fastened to each cover fixing groove 22C4 on the back side of each side panel 22C. In addition, the top main portion 21 is also assembled to the back frame 10 in a modularized state where the main pad 21A is covered with the main cover 21B, and the resin plate (not shown) coupled to the end of the main cover 21B is fastened to each cover fixing groove 21C3 on the back side of the main panel 21C.

Specifically, first, each top side portion 22 is brought close to the back frame 10 from the front, and the bosses 22C5 formed on the upper wall portion of each side panel 22C are inserted into the corresponding boss holes 12B formed in the left and right end portions of the upper frame 12 in order from above and fitted therein. As a result, the bosses 22C5 of the top side portions 22 are engaged with the left and right end portions of the upper frame 12, respectively.

Next, each side panel 22C is pressed against each side frame 11 in order from the front while portions where the bosses 22C5 are fitted serve as fulcrums. As a result, each clip CL mounted to the back surface of each side panel 22C is inserted from the front into the clip fitting hole 11B of each corresponding bracket 11A coupled to each side frame 11, and is integrally snap-fitted thereto.

As a result of the above assembly, each top side portion 22 is integrally assembled to the back frame 10. Next, the end of the upper edge side of the side cover 22B of each top side portion 22 is drawn toward the back side of the upper frame 12, and is hooked and fastened to the hook portion (not shown). Then, the end of the lower edge side of the side cover 22B of each top side portion 22 is drawn toward the back side of the lower frame 13, and is hooked and fastened to the hook groove (not shown).

As a result of the above assembly, each top side portion 22 is integrally assembled to each side frame 11. In this way, although it is necessary to extend a part of each top side portion 22 rearward relative to the back frame 10, each top side portion 22 is easily assembled only by access from the front.

As a result of the above assembly, each top side portion 22 is brought into a state of being firmly supported by each side frame 11 from the seat back side. Specifically, each top side portion 22 is integrally fixed to each side frame 11 by each of the clips CL that are arranged in the staggered manner at the three portions in the height direction.

In addition, each top side portion 22 is set in a state where the side abutment portion 22C2 of each side panel 22C is abutted against each side frame 11 from the seat width direction inner side so as to allow transmission of loads. Therefore, each top side portion 22 can strongly support a load received from the back of the seated person in the lateral direction from the inner side toward the outer side in the seat width direction by a fixing structure of the clips CL arranged in the staggered manner, and can also appropriately transmit the load from each side abutment portion 22C2 to each side frame 11 so as to receive the load in a widely distributed manner.

Next, the top main portion 21 is assembled to the back frame 10 from the front. Specifically, first, the top main portion 21 is brought close to the back frame 10 from the front, and each of the clips CL mounted to the two left and right portions of the main panel 21C is inserted into each corresponding clip fitting hole 12A formed in the front portion of the upper frame 12 from the front so as to be integrally snap-fitted thereto.

At the time of the above assembly, the top main portion 21 is set to be fitted from the front between the top side portions 22 previously assembled to the back frame 10, and thus an assembly position is roughly guided by the top side portions 22. As a result of the above assembly, the main pad 21A of the top main portion 21 is set in the state of covering from the front across the upper frame 12 and the lower frame 13. In addition, the eaves portion 21C2 of the main panel 21C is set to ride on the top of the upper frame 12.

Next, the end of the lower edge side of the main cover 21B is drawn toward the back side of the lower frame 13, and is hooked and fastened to the hook groove (not shown). As a result of the above assembly, the top main portion 21 is integrally assembled across the upper frame 12 and the lower frame 13. In this way, although it is necessary to extend a part of the top main portion 21 rearward relative to the back frame 10, the top main portion 21 is easily assembled only by access from the front.

As a result of the above assembly, the top main portion 21 is in a state where an upper portion and a lower portion thereof are firmly supported by the upper frame 12 and the lower frame 13 from the seat back side, respectively. In addition, the top main portion 21 is elastically supported in a planar manner from the seat back side by a contour mat (not shown) bridged between the upper frame 12 and the lower frame 13 in an in-frame region therebetween. As a result, the top main portion 21 can softly support the load received from the back of the seated person from the seat back side in the in-frame region between the upper frame 12 and the lower frame 13.

As described above, the top main portion 21 and the top side portions 22, which are constituent elements of the cushion portion 20, can be easily assembled to the back frame 10 only by access from the front without requiring an operator who assembles the cushion portion 20 to go around to the rear of the back frame 10. Therefore, directions in which the cushion portion 20 is assembled to the back frame 10 are unified, and thus ease of the assembly can be improved.

The top main portion 21 and the top side portions 22 constituting the cushion portion 20 are completely separated from each other, and are configured to elastically support the back of the seated person individually. Therefore, in the cushion portion 20, even when the back of the seated person is strongly pressed against the seat back 2 from the front and the top main portion 21 is strongly pushed rearward at the time of occurrence of a rear collision of a vehicle, the top side portions 22 are not pulled rearward by the top main portion 21.

Therefore, as compared with a configuration in which the top side portions 22 are connected to the top main portion 21, the top main portion 21 can sink further rearward in response to the load received from the back of the seated person. For this reason, when the rear collision of the vehicle occurs, as compared to a configuration in which sinking of the back of the seated person is stopped at a relatively early stage, it can be difficult for a head to tilt rearward in a whiplash manner with the back serving as a fulcrum.

As shown in FIG. 8, each divided surface M, which is a boundary surface between the top main portion 21 and each top side portion 22, has a bent divided surface shape as follows. That is, each divided surface M has a surface shape that includes: a first divided surface M1 that extends from the seat front side toward the seat back side; and a second divided surface M2 that is bent obliquely inward in the seat width direction from a seat back side extending tip of the first divided surface M1, and extends toward the seat back side.

With such a configuration, even if a foreign object or a finger of a user enters space between the top main portion 21 and each top side portion 22 from the seat front side, the foreign object or the finger of the user is easily restricted from entering deep at a bent portion between the first divided surface M1 and the second divided surface M2. Specifically, the first divided surface M1 is raised relative to the second divided surface M2 in the front-rear direction, and thus forms a surface shape, which extends from the seat front side to the seat back side, of each divided surface M.

In addition, a position where the second divided surface M2 of each divided surface M is bent from the extending tip of the first divided surface M1 is a position located on the seat back side relative to a center in a thickness direction (front-rear direction) of the top main portion 21. Due to the above divided structure, the top main portion 21 can be supported on the second divided surfaces M2 on both left and right sides thereof obliquely from the seat back side by each top side portion 22.

The side pad 22A of each top side portion 22 is made of urethane foam that is harder than the main pad 21A of the top main portion 21. For this reason, the cushion portion 20 can support the back of the seated person relatively softly from behind by the top main portion 21, and can side-support the back of the seated person with appropriate hardness by each top side portion 22.

Specifically, since the cushion portion 20 has the above divided structure, urethane foams with different hardness can be appropriately separated and provided in the top main portion 21 and each top side portion 22 without being mixed at a boundary portion therebetween. In addition, since each top side portion 22 is harder than the top main portion 21, the foreign object or the finger of the user can be more appropriately restricted from entering deep at the bent portion between the first divided surface M1 and the second divided surface M2.

The main cover 21B of the top main portion 21 is configured in such a manner that a top cover piece B1 stretched over the seat surface thereof and divided surface cover pieces B3 stretched over the left and right divided surfaces M are sewn together into a single piece. The top cover piece B1 includes extension portions B2 that extend on peripheral edges on left and right sides thereof so as to be stretched onto the first divided surface M1 of each divided surface M, and includes a sewn portion B4 where an edge portion of each extension portion B2 and an edge portion of each divided surface cover piece B3 are sewn on each first divided surface M1.

Similarly, the side cover 22B of each top side portion 22 is also configured in such a manner that the top cover piece B1 stretched over the seat surface thereof and the divided surface cover piece B3 stretched over the divided surface M between the top main portion 21 and each top side portion 22 are sewn together into a single piece. Each top cover piece B1 includes the extension portion B2 that extends so as to be stretched onto the first divided surface M1 of the divided surface M, and includes the sewn portion B4 where the edge portion of each extension portion B2 and the edge portion of each divided surface cover piece B3 are sewn on each first divided surface M1. In this way, since each sewn portion B4 is provided on the divided surface M separated from the seat surface, sitting comfort and appearance quality of the cushion portion 20 can be less likely to be impaired.

(Seat Cushion 3)

Figure 9:
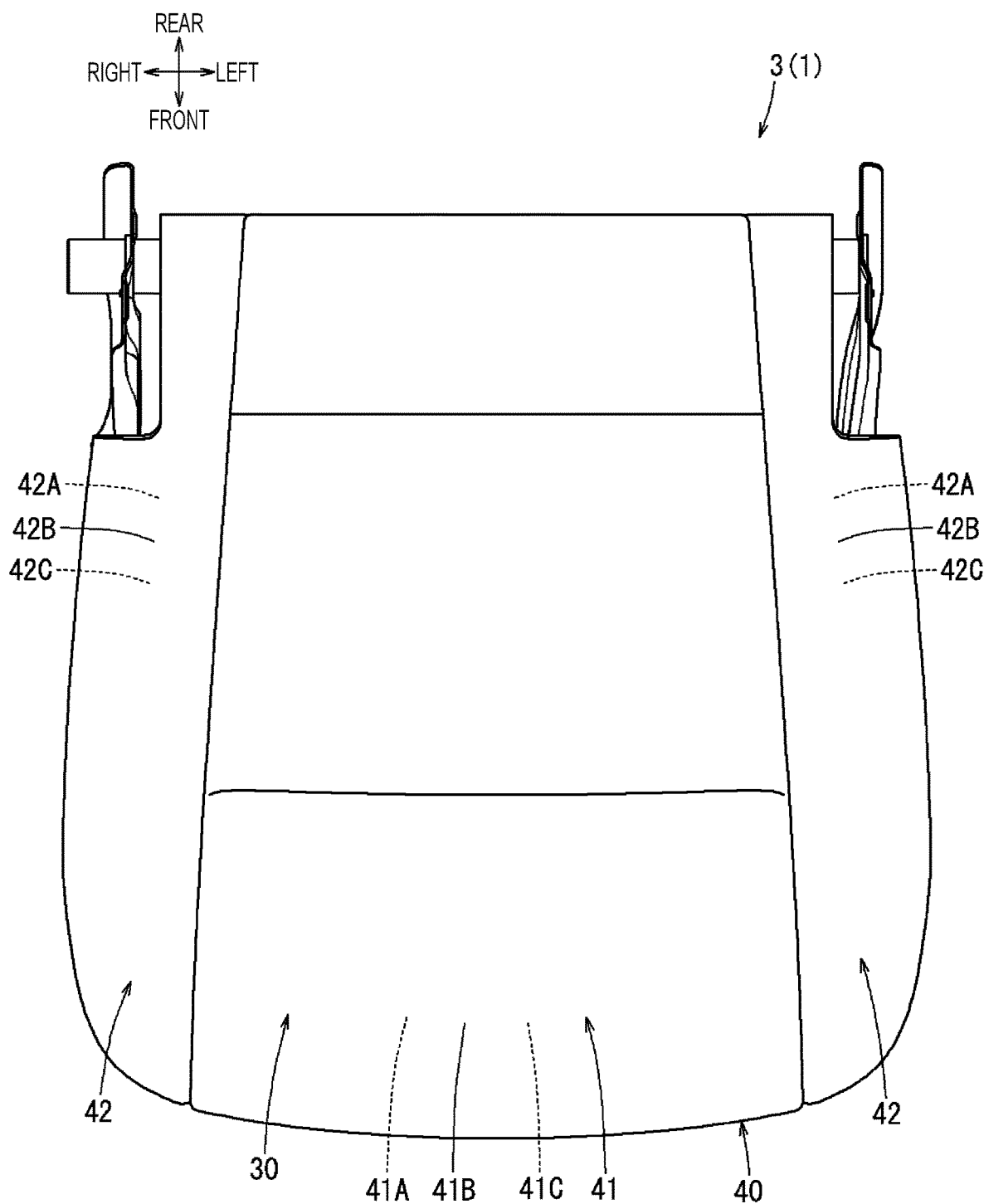
FIG. 9 is a plan view of a seat cushion.
Figure 10:
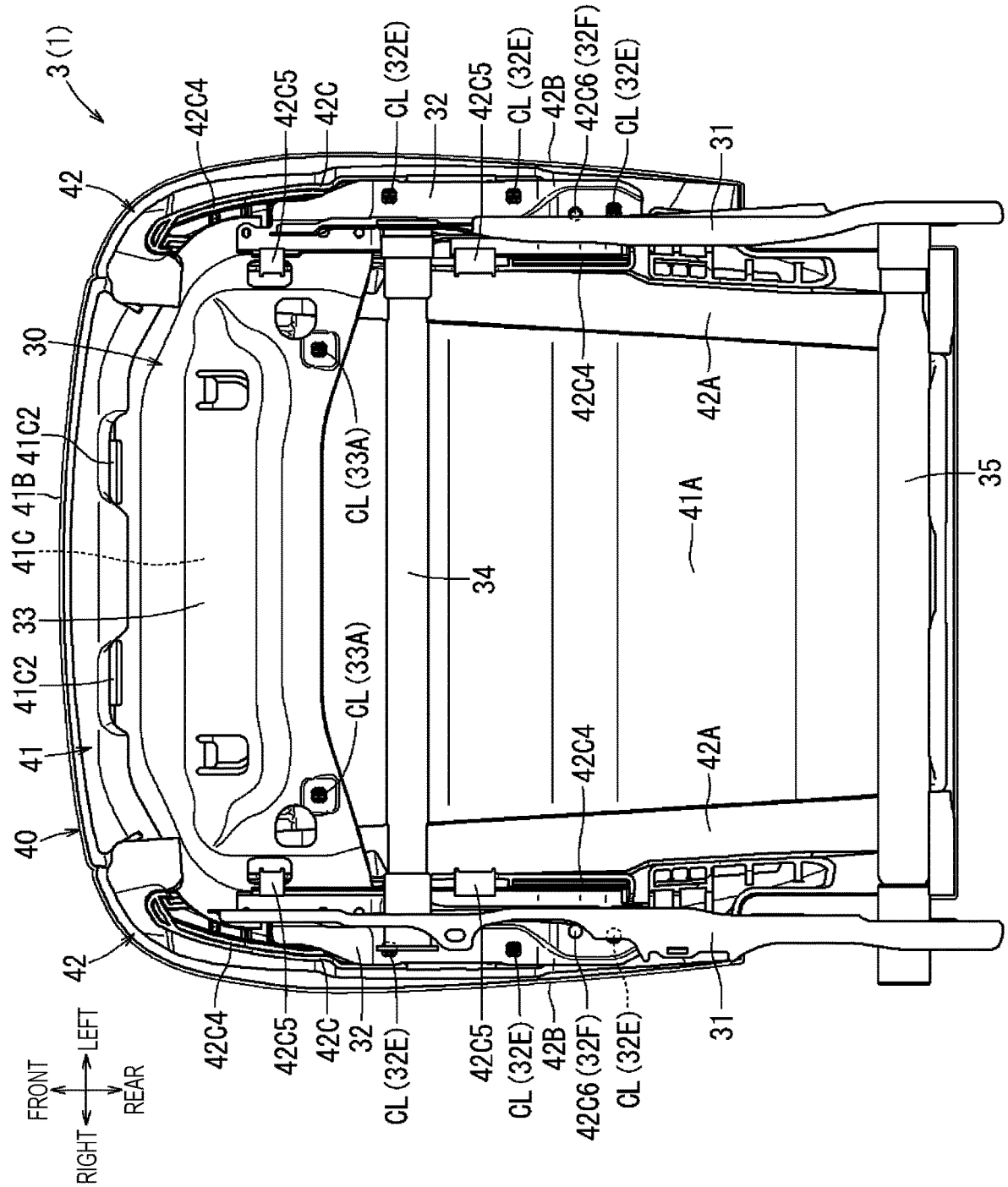
FIG. 10 is a bottom view of the seat cushion.
Figure 11:
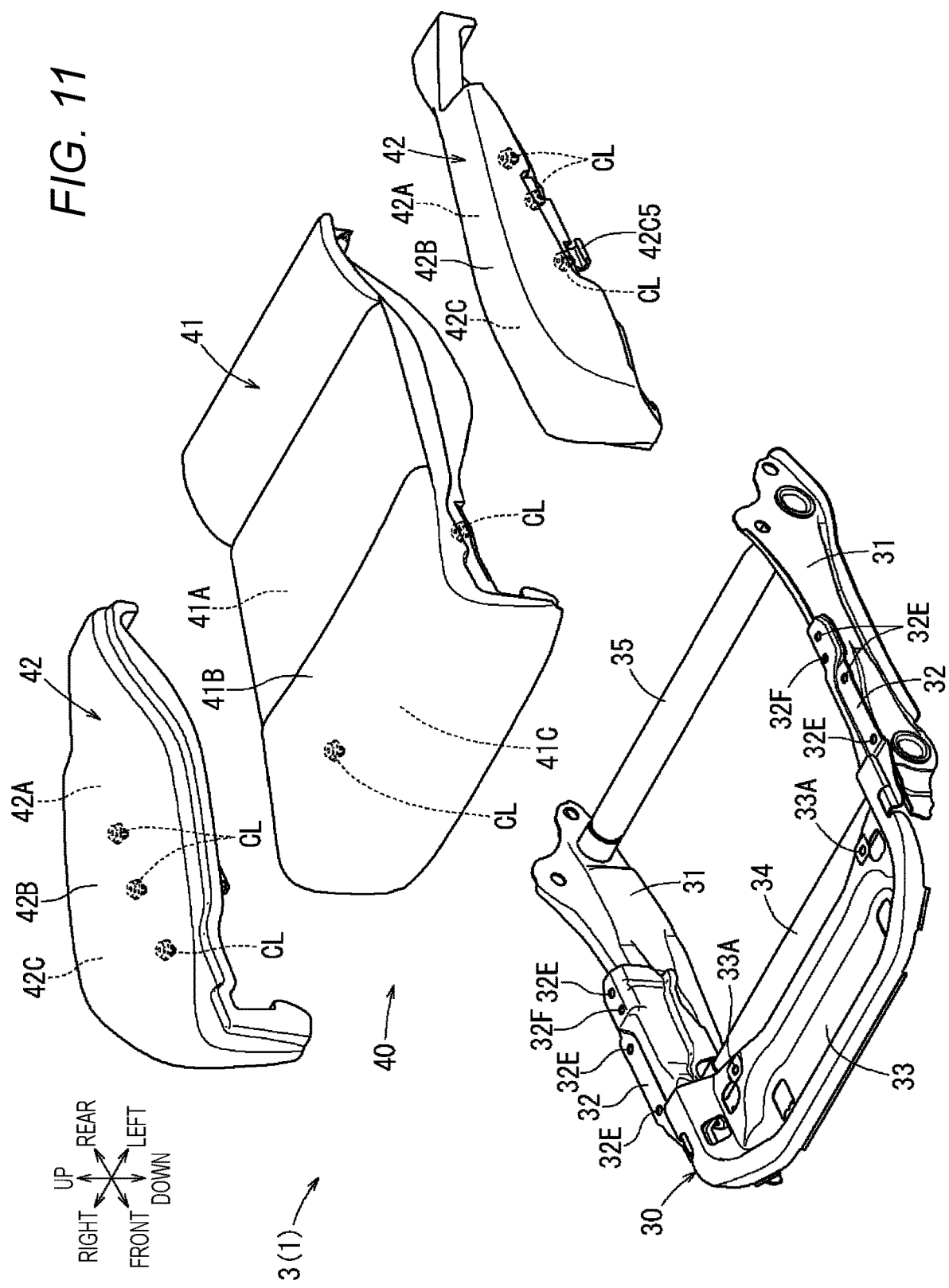
FIG. 11 is an exploded perspective view of the seat cushion.
Figure 12:
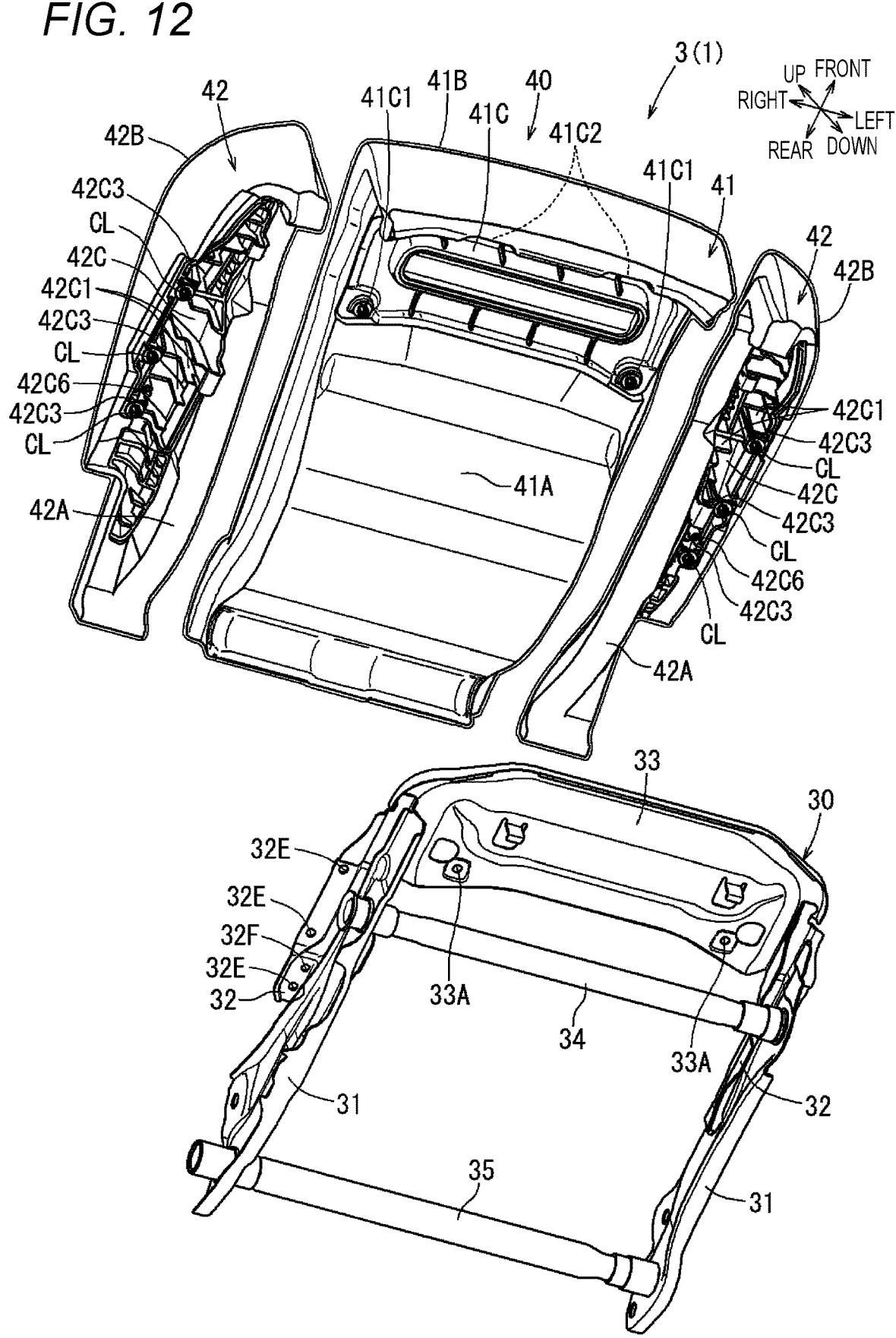
FIG. 12 is an exploded perspective view of FIG. 11 as viewed from a bottom side.

Next, a configuration of the seat cushion 3 will be described with reference to FIGS. 9 to 16. As shown in FIGS. 9 and 10, the seat cushion 3 includes the metal cushion frame 30 that forms an internal framework thereof, and the cushion portion 40 that is assembled to the cushion frame 30 and elastically supports the load of the seated person. As shown in FIGS. 11 and 12, the cushion frame 30 is configured to be assembled in a vertically long frame shape in a plan view.

Specifically, the cushion frame 30 includes a pair of left and right lower arms 31 that form a framework elongated in the front-rear direction along left and right side portions of the seat cushion 3. The cushion frame 30 also includes a pair of left and right tilt arms 32 that are assembled on front portions of the respective lower arms 31 so as to be rotatable in the height direction and are elongated in the front-rear direction. The cushion frame 30 also includes a tilt panel 33 that is formed of a laterally long panel material integrally bridged between front end portions of the respective tilt arms 32. The tilt panel 33 forms a laterally long framework along a front side portion of the seat cushion 3.

The tilt panel 33 is configured in such a manner that each tilt arm 32 is rotationally driven in the height direction relative to each lower arm 31 by a drive unit (not shown) in order to change an upright angle (seating surface angle) relative to each lower arm 31 (tilt mechanism 8). Specifically, the tilt panel 33 is configured to be switchable between a flat position where the tilt panel 33 is flush with an upper surface of each lower arm 31 together with each tilt arm 32, and an inclined position where the tilt panel 33 forms a forward rising angle relative to each lower arm 31 by pulling up and rotating each tilt arm 32 from the flat position.

The cushion frame 30 also includes a front pipe 34 integrally bridged between the front portions of the lower arms 31 and a rear pipe 35 integrally bridged between rear portions of the lower arms 31. Each of the lower arms 31 is formed of a metal plate press-formed product formed in a shape elongated in the front-rear direction. The lower arms 31 are arranged to face each other in the seat width direction. An upper edge and a lower edge of each of the lower arms 31 are bent rightward so as to from a frame shape whose cross section is U-shaped.

Each of the tilt arms 32 is also formed of a metal plate press-formed product formed in a shape elongated in the front-rear direction. Each tilt arm 32 is configured to form a frame shape having a stepped cross section. Specifically, each tilt arm 32 has a shape that includes a first top portion 32A, a first side portion 32B, a second top portion 32C, and a second side portion 32D.

Each first top portion 32A has a plate shape elongated in the front-rear direction along the upper surface of each lower arm 31. Each first top portion 32A has a plate shape protruding outward in the seat width direction from the upper surface of each lower arm 31.

Each first side portion 32B has a plate shape extending in a hanging manner from an inner edge portion in the seat width direction of each first top portion 32A. Each first side portion 32B faces each lower arm 31 from the seat width direction inner side, and is configured such that a rear end portion thereof is pin-joined to each lower arm 31 in a rotatable manner. Each tilt arm 32 is connected to each lower arm 31 by each pin joint so as to be rotatable in the height direction.

Each second top portion 32C has a plate shape that extends in a bent shape from a lower edge portion of each first side portion 32B toward the seat width direction inner side. Each second top portion 32C has a plate shape elongated in the front-rear direction at a position located on the seat width direction inner side below each lower arm 31. Each second side portion 32D has a plate shape extending in a hanging manner from an inner edge portion in the seat width direction of each second top portion 32C.

The tilt panel 33 is formed of a metal plate press-formed product formed in a shape elongated in the seat width direction. The tilt panel 33 is bridged between front end portions of the first top portions 32A of the tilt arms 32 and integrally welded thereto.

The cushion portion 40 includes the three divided elements, namely the top main portion 41 that forms a cushion structure of the central portion of the seat cushion 3 in the seat width direction, and the top side portions 42 that form cushion structures of the both side portions of the seat cushion 3 in the seat width direction. The top main portion 41 and the top side portions 42 are configured to be completely separated from each other, and are configured to be individually assembled and fixed to the cushion frame 30 from above.

(Top Main Portion 41)

Figure 13:
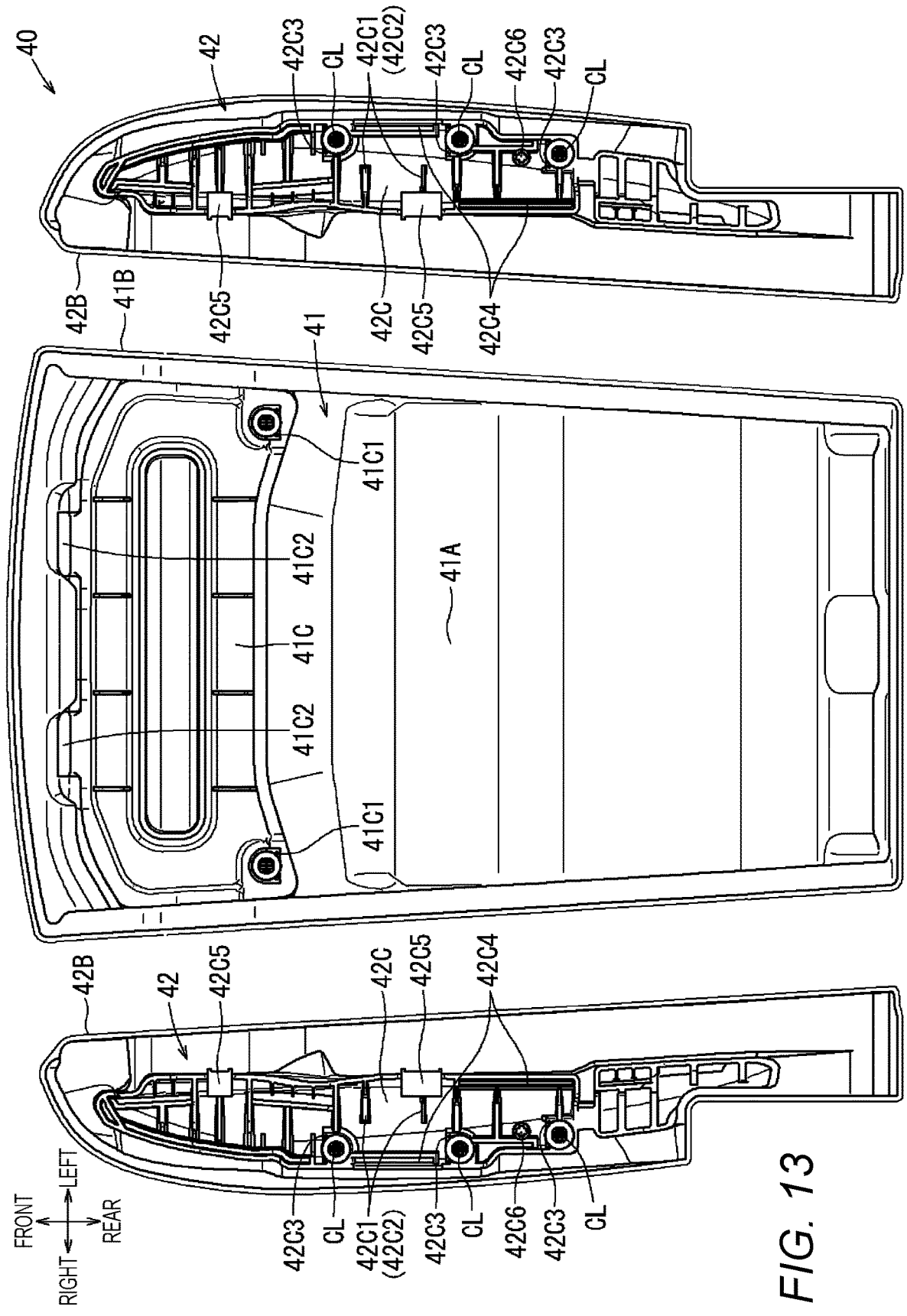
FIG. 13 is a bottom view of a cushion portion of the seat cushion.

As shown in FIGS. 10, 12, and 13, the top main portion 41 includes a main pad 41A that is made of urethane foam, and a main cover 41B that is made of fabric and covers an entire surface of the main pad 41A. The top main portion 41 also includes a main panel 41C that is made of resin and provided in a stacked manner along a back surface (lower surface) of a front portion of the main pad 41A.

Here, the main pad 41A corresponds to the "seat pad" of the present invention. In addition, the main cover 41B corresponds to the "seat cover" of the present invention. In FIGS. 10, 12, and 13, only an outline of the main cover 41B is shown by thin lines, and an internal structure covered by the main cover 41B is shown in a visualized manner.

The main pad 41A is set to be covered from above across the tilt panel 33 and the rear pipe 35 of the cushion frame 30, and is formed in a pad shape that is elongated in the front-rear direction. More specifically, the main pad 41A is formed in a wide pad shape that can cover an in-frame region between the lower arms 31 of the cushion frame 30 from above over most of the region in the seat width direction.

In addition, the main pad 41A has a shape whose front edge portion and whose rear edge portion extend downward in an eaves-like protruding shape. The main pad 41A is configured in such a manner that the front edge portion and the rear edge portion thereof, which protrude downward, also cover a front surface of the tilt panel 33 and a rear surface of the rear pipe 35 from above.

Figure 15:
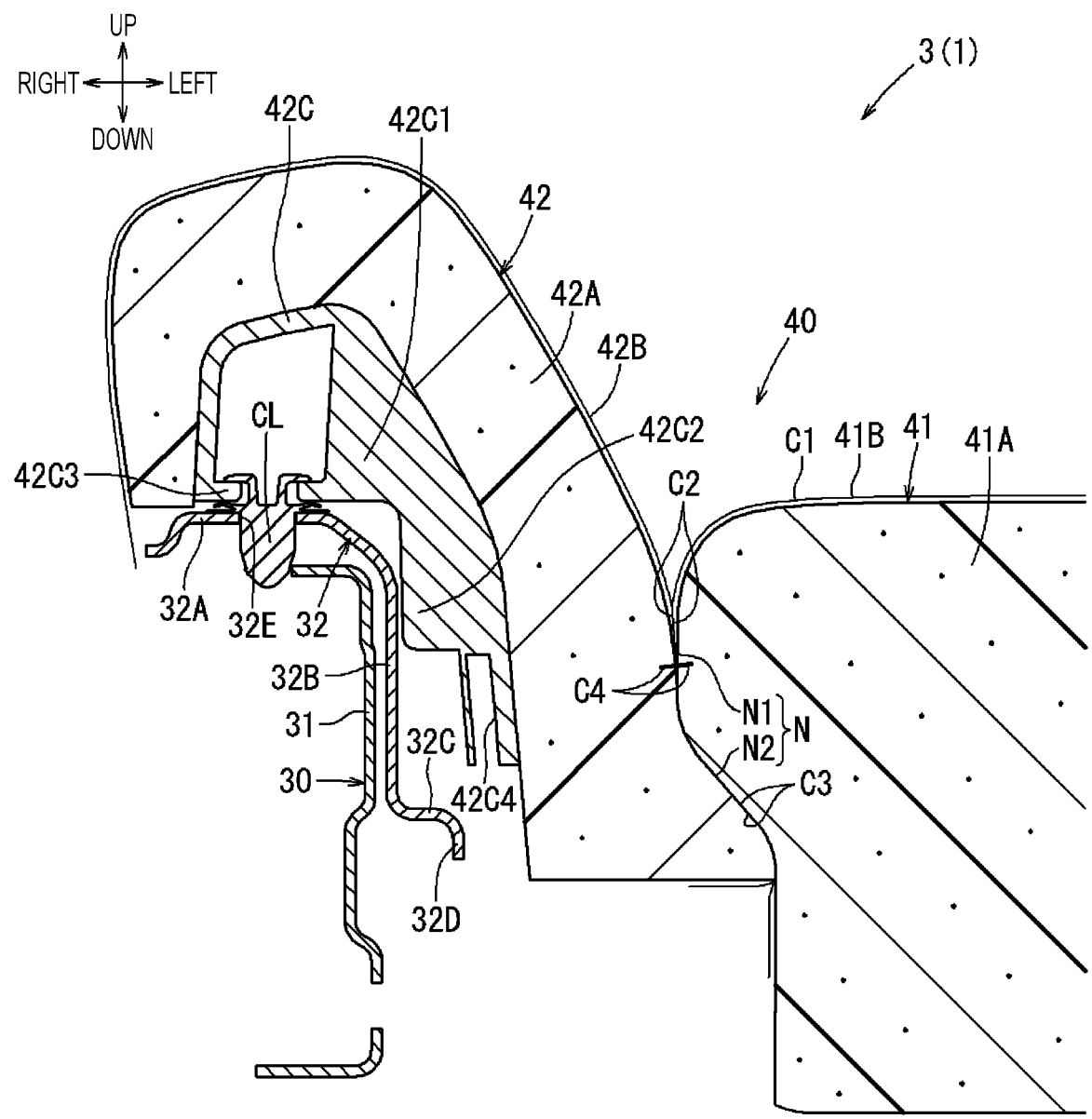
FIG. 15 is a cross-sectional view taken along line XV-XV of FIG. 14.
Figure 16:
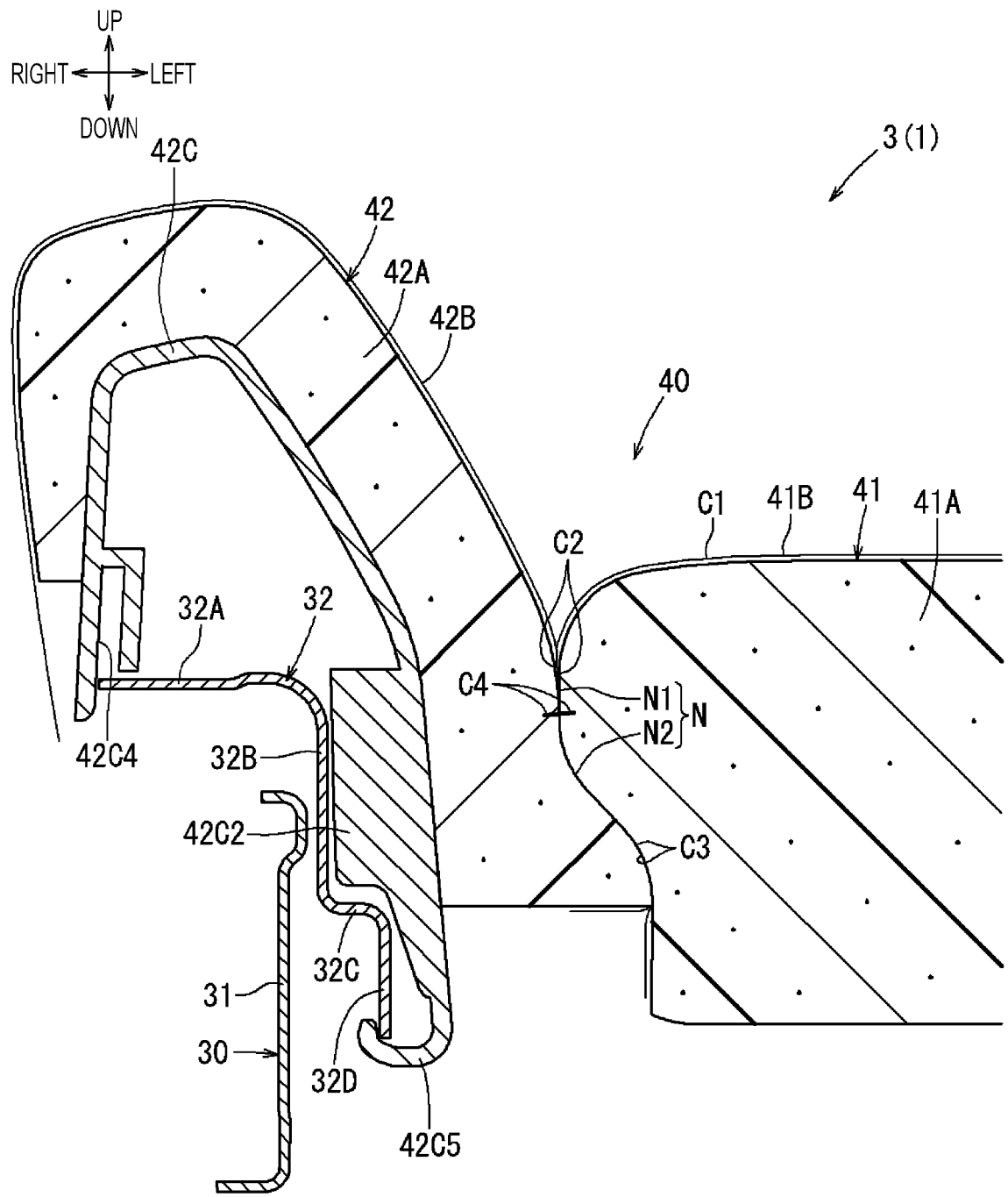
FIG. 16 is a cross-sectional view taken along line XVI-XVI of FIG. 14.

As shown in FIGS. 9, 15 and 16, the main pad 41A is configured in such a manner that a seat surface in contact with the buttocks of the seated person has a relatively flat surface shape facing upward, and is capable of elastically supporting the buttocks of the seated person straight from behind. As a result, the main pad 41A is configured to be capable of elastically supporting the buttocks of the seated person widely from below in the in-frame region of the cushion frame 30.

With reference to FIG. 13, at the time of foam molding of the main pad 41A, the main panel 41C is set in a mold to perform the foam molding, and thus the main pad 41A is formed in a state of being integrally joined to the main panel 41C. The main panel 41C is provided in a stacked manner along the front region of the main pad 41A, specifically, along the back surface (lower surface) of the front region of the main pad 41A that covers the tilt panel 33 from above, as shown in FIG. 12.

As shown in FIGS. 12 and 13, attachment pedestals 41C1, which protrude downward each in a pedestal shape, are formed at two positions, left and right, on a back surface of the main panel 41C. A clip CL, which is made of resin, is inserted into each attachment pedestal 41C1 from behind and is integrally mounted thereto. As a result of the above mounting, each clip CL is integrally fixed to each attachment pedestal 41C1 in a state where a tip end of each clip CL protrudes downward from each attachment pedestal 41C1.

As shown in FIG. 12, when the top main portion 41 is assembled to the cushion frame 30, each clip CL is inserted from above into each corresponding clip fitting hole 33A formed in the tilt panel 33. As a result, each clip CL is inserted into the respective clip fitting hole 33A of the tilt panel 33 while being elastically deformed, and is hooked on a peripheral edge of the respective clip fitting hole 33A due to an elastic force caused by restoration so as to be integrally snap-fitted thereto.

As a result of the above snap-fitting, the main pad 41A is set in a state of covering from above across the tilt panel 33 and the rear pipe 35. The main panel 41C is formed with a pair of left and right hook portions 41C2 that protrude downward from a central front edge portion of the main panel 41C.

Each hook portion 41C2 has a plate shape that extends in the seat width direction so as to be flush with a rear surface of the front edge portion, which protrudes downward, of the main pad 41A. Each clip CL of the main panel 41C is inserted into each clip fitting hole 33A of the tilt panel 33 from above and assembled thereto, and thus each hook portion 41C2 is hooked on a front edge of the tilt panel 33 from below and integrally snap-fitted thereto.

Specifically, as each clip CL is inserted, each hook portion 41C2 is pressed against the front edge of the tilt panel 33, pushed downward while being elastically deformed, hooked from below onto the front edge of the tilt panel 33 by the elastic force caused by the restoration, and is integrally snap-fitted thereto. As a result, a front edge of the main panel 41C is also integrally fixed to the tilt panel 33.

The main cover 41B covers the entire surface of the main pad 41A from above, and ends on front, rear, left, and right peripheral edge sides thereof are drawn toward the seat back side (lower side) through front, rear, left, and right peripheral surfaces of the main pad 41A. Ends, which are to be covered on left and right side surfaces of the main pad 41A, of the main cover 41B are fastened by coupling to the back surface (lower surface) of the main pad 41A by a coupling tool such as a hook-and-loop fastener (not shown).

In addition, an end, which is to be covered on a front surface of the main pad 41A, of the main cover 41B is fastened by hooking a J-hook (not shown) coupled to the same end on a hook portion (not shown) provided on a seat back side portion (lower portion) of the tilt panel 33. In addition, an end, which is to be covered on a rear surface of the main pad 41A, of the main cover 41B is fastened by hooking a J-hook (not shown) coupled to the same end from behind onto an S-spring (not shown) bridged between the rear pipe 35 and the front pipe 34.

(Top Side Portion 42)

As shown in FIGS. 10, 12, and 13, each top side portion 42 includes a side pad 42A that is made of urethane foam, and a side cover 42B that is made of fabric and covers an entire surface of the side pad 42A. Each top side portion 42 also includes a side panel 42C that is made of resin and provided in a stacked manner over a wide region in the front-rear direction along a back surface (lower surface) of the side pad 42A.

Here, each side pad 42A corresponds to the "seat pad" of the present invention. In addition, each side cover 42B corresponds to the "seat cover" of the present invention. In FIGS. 10, 12, and 13, only an outline of each side cover 42B is shown by thin lines, and an internal structure covered by each side cover 42B is shown in a visualized manner.

Each side pad 42A is set to be covered from above over an entire region in the front-rear direction across each lower arm 31 and each tilt arm 32 of the cushion frame 30, and is formed in a pad shape that is elongated in the front-rear direction. Specifically, each side pad 42A has a pad shape that is set to be aligned side by side with the main pad 41A with a gap therebetween in the seat width direction.

Each side pad 42A has a shape whose front edge portion and whose rear edge portion extend downward in an eaves-like protruding shape. Each side pad 42A is configured in such a manner that the front edge portion and the rear edge portion thereof, which protrude downward, also cover the tilt panel 33 and the rear pipe 35 of the cushion frame 30 from above.

In addition, each side pad 42A has a shape whose inner edge portion and whose outer edge portion in the seat width direction also extend downward in eaves-like protruding shapes. Each side pad 42A is configured in such a manner that the inner edge portion and the outer edge portion thereof, which protrude downward, also cover inner side surfaces and outer side surfaces of each lower arm 31 and each tilt arm 32 in the seat width direction from above.

As shown in FIGS. 9, 15 and 16, a seat surface of each side pad 42A, which is in contact with the buttocks of the seated person, is arranged side by side with the seat surface of the main pad 41A, and has a bank-like protruding shape that protrudes obliquely upward from the inner side toward the outer side in the seat width direction. As a result, each side pad 42A is configured to have a side support function capable of elastically supporting the buttocks of the seated person from a diagonally lower outer side in the seat width direction.

With reference to FIG. 13, at the time of foam molding of the side pad 42A, each corresponding side panel 42C is set in a mold to perform the foam molding, and thus each side pad 42A is formed in a state of being integrally joined to each corresponding side panel 42C. As shown in FIG. 12, each side panel 42C is provided in a stacked manner along most of a back surface region in the front-rear direction, which covers each lower arm 31 and each tilt arm 32, of each side pads 42A.

Specifically, as shown in FIGS. 15 and 16, each side panel 42C is provided in a shape that extends in the front-rear direction and has a U-shaped cross section along a concave surface shape recessed in the back surface of each side pad 42A. The recessed shape in the back surface of each side pad 42A is a bank-like recessed shape conforming to the bank-like protruding seat surface shape of each side pad 42A.

Therefore, the bank-like protruding portion of each side pad 42A is strongly supported in a planar manner from the seat back side along each inclined surface of each bank by each side panel 42C that is provided in the stacked manner along the bank-like concave surface shape of each side pad 42A. As a result, each side pad 42A is strongly supported from the seat back side by each side panel 42C so that the bank-like protruding portion thereof is less likely to fall inward or outward in the seat width direction.

Specifically, since each side pad 42A is supported in the planar shape from the seat back side by each side panel 42C, the load received from the buttocks of the seated person can be received while body pressure is widely distributed. For this reason, each top side portion 42 is capable of elastically supporting the buttocks of the seated person with appropriate hardness from the diagonally lower outer side in the seat width direction. In addition, even if each top side portion 42 receives a force that pushes inward and outward in the seat width direction when the seated person gets on and off the seat device 1 from the lateral direction, the bank-like shape thereof is less likely to fall inward and outward in the seat width direction.

When being assembled to each lower arm 31 and each tilt arm 32 from above, each side panel 42C is set in a state where the U-shaped cross section thereof covers each lower arm 31 and each tilt arm 32 from above and from the inner and outer sides in the seat width direction. As shown in FIGS. 12 and 13, plate-like ribs 42C1 are formed side by side at intervals at a plurality of locations in the front-rear direction on a back surface of each side panel 42C.

Each rib 42C1 is formed in a plate-like protruding shape inside the U shape of each side panel 42C. Specifically, each rib 42C1 is formed in an L-shaped plate-like protruding shape that is connected to an inner wall and an upper wall of the U-shaped cross section of each side panel 42C.

With reference to FIG. 13, when each side panel 42C is assembled to each lower arm 31 and each tilt arm 32 from above, each rib 42C1 is set such that an upper side portion of the L shape thereof faces upper edge portions of each lower arm 31 and each tilt arm 32 from above, that is, flange portions on upper edge sides bent inward in the seat width direction.

Then, an inner side portion (side abutment portion 42C2) of the L shape of each rib 42C1 is set to face seat width direction inner side surfaces of each lower arm 31 and each tilt arm 32. Specifically, the inner side portion (side abutment portion 42C2) of the L shape of each rib 42C1 is set to face the first side portion 32B (see FIGS. 15 and 16) from the seat width direction inner side relative to each tilt arm 32. As a result of the above assembly, in a region where the ribs 42C1 are formed, each side panel 42C is capable of being abutted against each lower arm 31 and each tilt arm 32 from above and from the seat width direction inner side so as to transmit a load thereto.

As shown in FIGS. 12 and 13, attachment pedestals 42C3, which protrude downward each in a pedestal shape, are formed at three positions in the front-rear direction on the back surface of each side panel 42C. A clip CL, which is made of resin, is inserted into each attachment pedestal 42C3 from the front or from behind, and is integrally mounted thereto. As a result of the above mounting, each clip CL is integrally fixed to each attachment pedestal 42C3 in a state where a tip end of each clip CL protrudes downward from each attachment pedestal 42C3.

As shown in FIG. 12, when each top side portion 42 is assembled to the cushion frame 30 from above, each clip CL is inserted from above into each corresponding clip fitting hole 32E formed in each tilt arm 32. As a result, each clip CL is inserted into the respective clip fitting hole 32E while being elastically deformed, and is hooked on a peripheral edge of the respective clip fitting hole 32E due to an elastic force caused by restoration so as to be integrally snap-fitted thereto.

As a result of the above snap-fitting, each side pad 42A is set in a state of covering from above across each corresponding lower arm 31 and tilt arm 32. Each attachment pedestal 42C3 is formed on an outer edge connected to an outer side wall of the U-shaped cross section of each side panel 42C. Therefore, as a result of the above snap-fitting of each clip CL, the outer edge of each side panel 42C is integrally fixed to each corresponding tilt arm 32.

Each side panel 42C is formed with hook portions 42C5 that protrude downward from lower edge portions at two positions, front and rear, on the inner side wall of the U-shaped cross section of each side panel 42C. Each clip CL of each side panel 42C is inserted into each clip fitting hole 32E of each corresponding tilt arm 32 from above and assembled thereto, and thus each hook portion 42C5 is hooked onto the second side portion 32D of each corresponding tilt arm 32 from below and is integrally snap-fitted thereto (see FIG. 15).

Specifically, as each clip CL is inserted, each hook portion 42C5 is pressed against the second side portion 32D of each tilt arms 32, pushed downward while being elastically deformed, hooked from below onto each second side portion 32D by an elastic force caused by restoration, and is integrally snap-fitted thereto. As a result, an inner side edge of each side panel 42C is also integrally fixed to each corresponding tilt arm 32.

Figure 17:
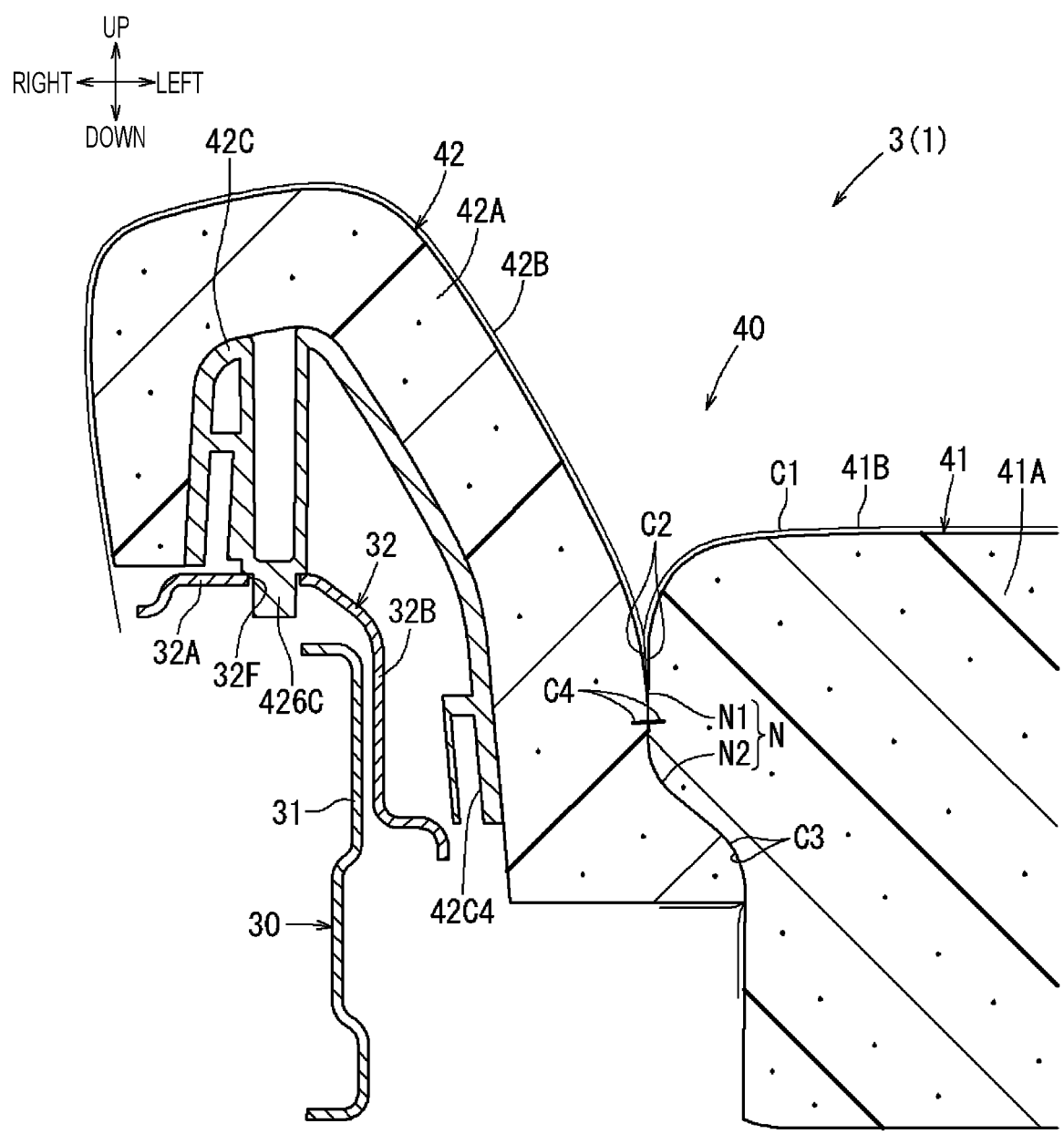
FIG. 17 is a cross-sectional view taken along line XVII-XVII of FIG. 14.

As shown in FIG. 13, each side panel 42C is formed with a boss 42C6 that protrudes downward in a cylindrical shape between the first and second attachment pedestals 42C3 from behind on the back surface of each side panel 42C. As shown in FIGS. 12 and 17, when each top side portion 42 is assembled to the cushion frame 30 from above, each boss 42C6 is a portion that is inserted from above and fitted into each corresponding boss hole 32F formed in each tilt arm 32. As a result of the above fitting, the side panels 42C are set in a state of being abutted against the tilt arms 32 in the front, rear, left and right directions so as to be restricted from moving.

Figure 14:
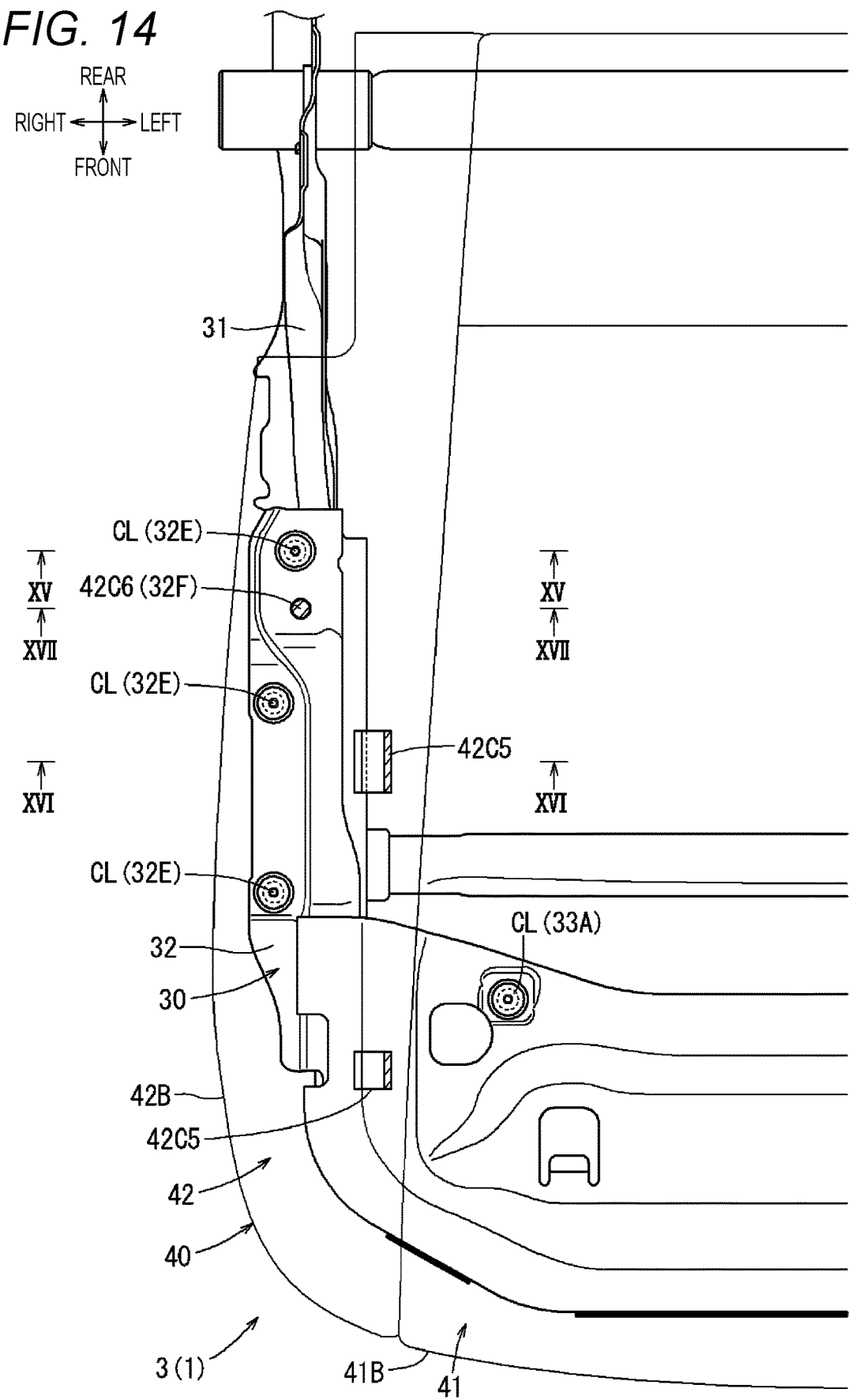
FIG. 14 is a plan view showing an interior of the seat cushion in a visualized manner.

As shown in FIGS. 13 and 14, the attachment pedestals 42C3 where the clips CL are mounted, the hook portions 42C5, and the bosses 42C6 on the left and right sides are arranged at positions offset from each other in the front-rear direction. In addition, the attachment pedestals 42C3, the bosses 42C6, and the hook portions 42C5 on the left and right sides are also offset from each other in the seat width direction so as to form a staggered arrangement.

Cover fixing grooves 42C4 are formed in the lower edge of the inner side wall and a lower edge of the outer side wall of the U-shaped cross section of each side panel 42C, and each of the cover fixing grooves 42C4 is recessed in a streak shape extending along each edge. The cover fixing grooves 42C4 are each formed in a slit shape that is opened downward, and serve as portions configured to fix ends, which are to be covered on left and right side surfaces of each side pad 42A, of each side cover 42B. Specifically, a resin plate (not shown) coupled along each end of each side cover 42B is inserted into each cover fixing groove 42C4 from below, and thus each resin plate is hooked and fixed so as not to be pulled out downward by tension caused by stretching of each side cover 42B.

Each side cover 42B covers the entire surface of each corresponding side pad 42A from above, and ends on front, rear, left, and right peripheral edge sides thereof are drawn toward the seat back side (lower side) through front, rear, left, and right peripheral surfaces of each corresponding side pad 42A. Ends, which are to be covered on the left and right side surfaces of each side pad 42A, of each side cover 42B are fixed to the cover fixing grooves 42C4 on the back side of each corresponding side panel 42C by the resin plate (not shown).

In addition, an end, which is to be covered on a front surface of each side pad 42A, of each side cover 42B is fastened by hooking a J-hook (not shown) coupled to the same end on a hook portion (not shown) provided on the seat back side portion (lower portion) of the tilt panel 33. In addition, an end, which is to be covered on a rear surface of each side pad 42A, of each side cover 42B is fastened by hooking a J-hook (not shown) coupled to the same end on a hook portion fixed to a seat back side portion (lower portion) of the rear pipe 35.

(Assembly of Top Main Portion 41 and Each Top Side Portion 42)

The top main portion 41 and the top side portions 42 constituting the cushion portion 40 are assembled to the cushion frame 30 from above by the following procedure. First, each top side portion 42 of the cushion portion 40 is assembled to the cushion frame 30 in order from above earlier than the top main portion 41.

Each top side portion 42 is assembled to the cushion frame 30 in a modularized state where each side pad 42A is covered with each corresponding side cover 42B, and the resin plate (not shown) coupled to the end of each side cover 42B is fastened to each cover fixing groove 42C4 on the back side of each side panel 42C. In addition, the top main portion 41 is also assembled to the cushion frame 30 in a modularized state where the main pad 41A is covered with the main cover 41B, and both left and right ends of the main cover 41B are coupled to the back surface (lower surface) of the main pad 41A by a coupling tool such as a hook-and-loop fastener (not shown).

Specifically, first, each top side portion 42 is brought close to the cushion frame 30 from above, and each clip CL mounted to the back surface of each side panel 42C is inserted into each corresponding clip fitting hole 32E formed in each tilt arm 32 from above so as to be integrally snap-fitted thereto. As a result, each hook portion 42C5 formed on the lower edge of the inner side wall of each side panel 42C is also hooked on a lower edge of the second side portion 32D of each tilt arm 32 and are integrally snap-fitted thereto.

In addition, each boss 42C6 formed on the back surface of each side panel 42C is also inserted into each corresponding boss hole 32F formed in each tilt arm 32 from above and fitted therein. As a result of the above assembly, each top side portion 42 is integrally assembled to the cushion frame 30.

Next, the end of the front edge side of the side cover 42B of each top side portion 42 is drawn toward the back side of the tilt panel 33, and is hooked and fastened to the hook portion (not shown). Then, the end of the rear edge side of the side cover 42B of each top side portion 42 is drawn toward the back side of the rear pipe 35, and is hooked and fastened to the hook portion coupled to the rear pipe 35.

As a result of the above assembly, each top side portion 42 is integrally assembled to the cushion frame 30. In this way, although it is necessary to extend a part of each top side portion 42 downward relative to the cushion frame 30, each top side portion 42 is easily assembled only by access from above.

As a result of the above assembly, each top side portion 42 is brought into a state of being firmly supported by each tilt arm 32 and each lower arm 31 from the seat back side. Specifically, each top side portion 42 is assembled to the cushion frame 30 so as to be movable following a tilting operation of the tilt panel 33.

Each top side portion 42 is integrally fixed to each tilt arm 32 by each of the hooking portions 42C5, the clips CL, and the bosses 42C6, which are arranged in the staggered manner offset in the seat width direction. In addition, each top side portion 42 is set in a state where the side abutment portion 42C2 of each side panel 42C is abutted against each tilt arm 32 and each lower arm 31 from the seat width direction inner side so as to allow transmission of loads. Therefore, each top side portion 42 can strongly support a load received from the buttocks of the seated person in the lateral direction from the inner side toward the outer side in the seat width direction by a fixing structure of each of the clips CL, the hook portions 42C5, and the bosses 42C6 arranged in the staggered manner, and can also appropriately transmit the load from each side abutment portion 42C2 to each tilt arm 32 and each lower arm 31 so as to receive the load in a widely distributed manner.

Next, the top main portion 41 is assembled to the cushion frame 30 from above. Specifically, first, the top main portion 41 is brought close to the cushion frame 30 from above, and each of the clips CL mounted to the two left and right portions of the main panel 41C is inserted into each corresponding clip fitting hole 33A formed in the tilt panel 33 from above so as to be integrally snap-fitted thereto.

At the time of the above assembly, the top main portion 41 is set to be fitted from above between the top side portions 42 previously assembled to the cushion frame 30, and thus an assembly position is roughly guided by the top side portions 42. As a result of the above assembly, the main pad 41A of the top main portion 41 is set in the state of covering from above across the tilt panel 33 and the rear pipe 35. In addition, each hook portion 41C2 of the main panel 41C is hooked on the front edge of the tilt panel 33 and integrally snap-fitted thereto.

Next, the end of the front edge side of the main cover 41B is drawn toward the back side of the tilt panel 33, and is hooked and fastened to the hook portion (not shown). Then, the end on the rear edge side of the main cover 41B is drawn toward the back side of the rear pipe 35, and is hooked and fastened from behind to an S-spring (not shown) bridged between the rear pipe 35 and the front pipe 34.

As a result of the above assembly, the top main portion 41 is integrally assembled across the tilt panel 33 and the rear pipe 35. In this way, although it is necessary to extend a part of the top main portion 41 downward relative to the cushion frame 30, the top main portion 41 is easily assembled only by access from above.

As a result of the above assembly, the top main portion 41 is in a state where a front portion and a rear portion thereof are firmly supported by the tilt panel 33 and the rear pipe 35, respectively, from the seat back side. Specifically, the top main portion 41 is assembled to the cushion frame 30 so as to be movable following the tilting operation of the tilt panel 33.

In addition, the top main portion 41 is elastically supported in a planar manner from the seat back side by a plurality of S-springs (not shown) bridged between the tilt panel 33 and the rear pipe 35 in an in-frame region therebetween. As a result, the top main portion 41 can softly support the load received from the buttocks of the seated person from the seat back side in the in-frame region between the tilt panel 33 and the rear pipe 35.

As described above, the top main portion 41 and the top side portions 42, which are constituent elements of the cushion portion 40, can be easily assembled to the cushion frame 30 only by access from above without requiring an operator who assembles the cushion portion 40 to go around to the lower side of the cushion frame 30. Therefore, directions in which the cushion portion 40 is assembled to the cushion frame 30 are unified, and thus ease of the assembly can be improved.

The top main portion 41 and the top side portions 42 constituting the cushion portion 40 are completely separated from each other, and are configured to elastically support the buttocks of the seated person individually. Therefore, in the cushion portion 40, even when the top main portion 41 is strongly pushed rearward and obliquely downward by the buttocks of the seated person at the time of the occurrence of the rear collision of the vehicle, the top side portions 42 are not pulled downward by the top main portion 41.

Therefore, as compared with a configuration in which the top side portions 42 are connected to the top main portion 41, the top main portion 41 can sink further downward in response to the load received from the buttocks of the seated person. For this reason, when the rear collision of the vehicle occurs, as compared to a configuration in which sinking of the buttocks of the seated person is stopped at a relatively early stage, it can be difficult for the back of the seated person to slide upward along the seat back 2.

As shown in FIGS. 15 and 16, each divided surface N, which is a boundary surface between the top main portion 41 and each top side portion 42, has a bent divided surface shape as follows. That is, each divided surface N has a surface shape that includes: a first divided surface N1 that extends from the seat front side toward the seat back side; and a second divided surface N2 that is bent obliquely inward in the seat width direction from a seat back side extending tip of the first divided surface N1, and extends toward the seat back side.

With such a configuration, even if a foreign object or a finger of a user enters space between the top main portion 41 and each top side portion 42 from the seat front side, the foreign object or the finger of the user is easily restricted from entering deep at a bent portion between the first divided surface N1 and the second divided surface N2. Specifically, the first divided surface N1 is raised relative to the second divided surface N2 in the height direction, and thus forms a surface shape, which extends from the seat front side to the seat back side, of each divided surface N.

In addition, a position where the second divided surface N2 of each divided surface N is bent from the extending tip of the first divided surface N1 is a position located on the seat back side relative to a center in a thickness direction (front-rear direction) of the top main portion 41. Due to the above divided structure, the top main portion 41 can be supported on the second divided surfaces N2 on both left and right sides thereof obliquely from the seat back side by each top side portion 42.

The side pad 42A of each top side portion 42 is made of urethane foam that is harder than the main pad 41A of the top main portion 41. For this reason, the cushion portion 40 can support the buttocks of the seated person relatively softly from below by the top main portion 41, and can side-support the buttocks of the seated person with appropriate hardness by each top side portion 42.

Specifically, since the cushion portion 40 has the above divided structure, urethane foams with different hardness can be appropriately separated and provided in the top main portion 41 and each top side portion 42 without being mixed at a boundary portion therebetween. In addition, since each top side portion 42 is harder than the top main portion 41, the foreign object or the finger of the user can be more appropriately restricted from entering deep at the bent portion between the first divided surface N1 and the second divided surface N2.

The main cover 41B of the top main portion 41 is configured in such a manner that a top cover piece C1 stretched over the seat surface thereof and divided surface cover pieces C3 stretched over the left and right divided surfaces N are sewn together into a single piece. The top cover piece C1 includes extension portions C2 that extend on peripheral edges on left and right sides thereof so as to be stretched onto the first divided surface N1 of each divided surface N. and includes a sewn portion C4 where an edge portion of each extension portion C2 and an edge portion of each divided surface cover piece C3 are sewn on each first divided surface N1.

Similarly, the side cover 42B of each top side portion 42 is also configured in such a manner that the top cover piece C1 stretched over the seat surface thereof and the divided surface cover piece C3 stretched over the divided surface N between the top main portion 41 and each top side portion 42 are sewn together into a single piece. Each top cover piece C1 includes the extension portion C2 that extends so as to be stretched onto the first divided surface N1 of the divided surface N, and includes the sewn portion C4 where the edge portion of each extension portion C2 and the edge portion of each divided surface cover piece C3 are sewn on each first divided surface N1. In this way, since each sewn portion C4 is provided on the divided surface N separated from the seat surface, sitting comfort and appearance quality of the cushion portion 40 can be less likely to be impaired.

SUMMARY

In summary, the seat device 1 according to the present embodiment has the following configuration. In the following description, reference numerals in parentheses are reference numerals corresponding to the respective configurations shown in the above embodiment.

That is, a seat device (1) includes a cushion portion (20) that elastically supports a seated person, and a seat frame (10) that supports the cushion portion (20). The cushion portion (20) includes a plurality of divided cushions (21, 22) divided in a seat width direction.

Each of the plurality of divided cushions (21, 22) includes a seat pad (21A, 22A) and a seat cover (21B, 22B) individually covering the seat pad (21A, 22A). A divided surface (M) between the divided cushions (21, 22) adjacent to each other includes: a first divided surface (M1) extending from a seat front side toward a seat back side; and a second divided surface (M2) that is bent from a seat back side extending tip of the first divided surface (M1) in a direction different from a direction in which the first divided surface (M1) extends and extends toward the seat back side.

According to the above configuration, even w % ben a foreign object enters space between the divided cushions (21, 22) adjacent to each other, the foreign object is easily restricted from entering deep by the bent shape between the first divided surface (M1) and the second divided surface (M2). Therefore, it can be difficult for the foreign object to enter deep between the divided cushions (21, 22).

In addition, the plurality of divided cushions (21, 22) include three divided elements, namely a top main portion (21) that forms a central portion in the seat width direction, and top side portions (22) that form two side portions in the seat width direction of a seat back (2) of the seat device (1). According to the above configuration, since dividing lines of the divided cushions (21, 22) are provided between the top main portion (21) and the top side portions (22) located on both sides of the top main portion (21), the cushion portion (20) can be appropriately divided in the seat width direction in such a manner that sitting comfort is not impaired.

In addition, the first divided surface (M1) extends in a direction that rises in a thickness direction relative to the second divided surface (M2), and the second divided surface (M2) is bent obliquely inward in the seat width direction. According to the above configuration, the top side portions (22) support the top main portion (21) from the seat back side. In addition, even if the top main portion (21) is set between the top side portions (22) after the top side portions (22) are set on the seat frame (10), assembly thereof is less likely to be hindered.

In addition, the seat pad (22A) of each top side portion (22) is made of urethane foam that is harder than the seat pad (21A) of the top main portion (21). According to the above configuration, side support provided for the seated person can be improved by the hardness of the top side portions (22). In addition, the effect of restricting entry of the foreign object can be improved by the hardness of the top side portions (22).

In addition, a top cover piece (B1) that is stretched over a seat surface of the seat cover (21B, 22B) includes an extension portion (B2) that extends so as to be stretched onto the divided surface (M), and a sewn portion (B4) where the top cover piece (B1) is sewn with a divided surface cover piece (B3) stretched over the divided surface (M) on the divided surface (M). According to the above configuration, since the sewn portion (B4) of the seat cover (21B. 22B) is provided on the divided surface (M) separated from the seat surface, the sitting comfort and appearance quality of the seat device (1) can be less likely to be impaired.

Similarly, a seat device (1) includes a cushion portion (40) that elastically supports a seated person, and a seat frame (30) that supports the cushion portion (40). The cushion portion (40) includes a plurality of divided cushions (41, 42) divided in a seat width direction.

Each of the plurality of divided cushions (41, 42) includes a seat pad (41A, 42A) and a seat cover (41B, 42B) individually covering the seat pad (41A. 42A). A divided surface (N) between the divided cushions (41, 42) adjacent to each other includes: a first divided surface (N1) extending from a seat front side toward a seat back side; and a second divided surface (N2) that is bent from a seat back side extending tip of the first divided surface (N1) in a direction different from a direction in which the first divided surface (N1) extends and extends toward the seat back side.

According to the above configuration, even when a foreign object enters space between the divided cushions (41, 42) adjacent to each other, the foreign object is easily restricted from entering deep by the bent shape between the first divided surface (N1) and the second divided surface (N2). Therefore, it can be difficult for the foreign object to enter deep between the divided cushions (41, 42).

In addition, the plurality of divided cushions (41, 42) include three divided elements, namely a top main portion (41) that forms a central portion in the seat width direction, and top side portions (42) that form two side portions in the seat width direction of a seat cushion (3) of the seat device (1). According to the above configuration, since dividing lines of the divided cushions (41, 42) are provided between the top main portion (41) and the top side portions (42) located on both sides of the top main portion (41), the cushion portion (40) can be appropriately divided in the seat width direction in such a manner that sitting comfort is not impaired.

In addition, the first divided surface (N1) extends in a direction that rises in a thickness direction relative to the second divided surface (N2), and the second divided surface (N2) is bent obliquely inward in the seat width direction. According to the above configuration, the top side portions (42) support the top main portion (41) from the seat back side. In addition, even if the top main portion (41) is set between the top side portions (42) after the top side portions (42) are set on the seat frame (30), assembly thereof is less likely to be hindered.

In addition, the seat pad (42A) of each top side portion (42) is made of urethane foam that is harder than the seat pad (41A) of the top main portion (41). According to the above configuration, side support provided for the seated person can be improved by the hardness of the top side portions (42). In addition, the effect of restricting entry of the foreign object can be improved by the hardness of the top side portions (42).

In addition, a top cover piece (C1) that is stretched over a seat surface of the seat cover (41B, 42B) includes an extension portion (C2) that extends so as to be stretched onto the divided surface (N), and a sewn portion (C4) where the top cover piece (C1) is sewn with a divided surface cover piece (C3) stretched over the divided surface (N) on the divided surface (N). According to the above configuration, since the sewn portion (C4) of the seat cover (41B, 42B) is provided on the divided surface (N) separated from the seat surface, the sitting comfort and appearance quality of the seat device (1) can be less likely to be impaired.

Other Embodiments

Although embodiments of the present disclosure have been described above using one embodiment, the present disclosure can be implemented in various forms described below in addition to the above-described embodiment.

<1> The seat device of the present invention may be applied to a car other than an automobile, such as a railway car, or a vehicle other than a car, such as an aircraft or a ship, in addition to the automobile. In addition, the seat device may also be applied as a seat device that is not used on a vehicle, such as a bleacher installed in various facilities such as a sports facility, a theater, a concert hall, or an event hall, or a massage seat in addition to the vehicle.

In addition, the seat device may also be configured such that only one of the seat back and the seat cushion is divided. In addition, the seat device may also be configured in such a manner that the number of divisions is different between the seat back and the seat cushion.

<2> The cushion portion may include two divided cushions that are divided into two in the seat width direction. In addition, the cushion portion may also include a plurality of divided cushions divided into four or more parts in the seat width direction.

Further, the cushion portion may be configured in such a manner that any of the divided cushions divided in the seat width direction is also divided in the length direction (the height direction for the seatback, and the front-rear direction for the seat cushion). For example, by dividing each top side portion of the seat back in the height direction, it is possible to partially change only both shoulder portions of the seat back to desired shapes, such as downward inclining shoulder shapes or upward inclining shoulder shapes.

<3> The divided surface between the divided cushions adjacent to each other may include a first divided surface extending from the seat front side toward the seat back side, and a second divided surface that is bent from a seat back side extending tip of the first divided surface toward the seat back side in a direction different from a direction in which the first divided surface extends. That is, the second divided surface may be bent in the seat width direction outer side. In addition, the first divided surface may be bent obliquely in the seat width direction, and the second divided surface may extend so as to rise in the seat front-back direction relative to the first divided surface.

In addition, the first divided surface and the second divided surface may have shapes that extend in the same seat width direction with different rising angles in the seat front-back direction. In addition, the first divided surface and the second divided surface may have shapes that extend in the seat width direction in directions opposite to each other. In addition, each of the first divided surface and the second divided surface may extend linearly in the seat front-back direction, or may extend in a curved manner. The second divided surface may have a stepped divided surface shape that is bent in the seat width direction from the seat back side extending tip of the first divided surface and further extends straight to the seat back side therefrom.

<4> The seat pad of the top side portion and the seat pad of the top main portion may be made of urethane foam having the same hardness. In addition, the seat pad of the top main portion may also be made of urethane foam that is harder than the seat pad of the top side portion. In addition, hardness adjustment for differentiating the hardness of the seat pads between the divided cushions may be achieved by differentiating sizes of the resin members provided on the back side of the seat pads from each other in order to change a thickness of each seat pad, in addition to differentiating the hardness by forming the seat pads with different materials or density.

<5> The resin member may be integrated with the seat pad by being integrally molded with the seat pad, or may be integrated with the seat pad by joining an end of the seat cover wrapped in the seat pad to the resin member instead of being integrally molded with the seat pad.

<6> The seat cover may be integrated with the seat pad by a so-called cover integrated foaming method. The seat cover may be made of a leather material in addition to the fabric.

The sewn portion between the top cover piece and the divided surface cover piece of the seat cover is not limited to be located on the first divided surface, and may also be located on the second divided surface.

<7> In the embodiment described above, the fixing structure that fixes the side panel on the seat back side to the back frame is exemplified as a structure in which the clips arranged in the staggered manner offset in the seat width direction are inserted into the back frame and snap-fitted thereto. In addition, the fixing structure that fixes the side panel on the seat cushion side to the cushion frame is exemplified as a structure in which the clips and the hooking portions, which are arranged in the staggered manner offset in the seat width direction, are inserted into or hooked on the cushion frame and snap-fitted thereto.

However, the fixing structure that fixes the side panel on the seat back side to the back frame may also be the structure that fixes the side panel on the seat cushion side to the cushion frame (the structure including the clips and the hook portions arranged in the staggered manner). In addition, the fixing structure that fixes the side panel on the seat cushion side to the cushion frame may also be the structure that fixes the side panel on the seat back side to the back frame (the structure including the clips arranged in the staggered manner).

<8> The plurality of divided cushions may not include the resin member. The plurality of divided cushions may be configured to be assembled to the seat frame by a fastening unit other than the clip, such as a bolt.

What is claimed is:
1. A seat device comprising:
    a cushion portion configured to elastically support a seated person; and
    a seat frame configured to support the cushion portion,
    wherein the cushion portion includes a plurality of divided cushions divided in a seat width direction, the plurality of divided cushions including three divided cushions composed of a top main portion that forms a central portion in the seat width direction, and two top side portions that form two side portions sandwiching the top main portion in the seat width direction of the seat device,
    each of the three divided cushions includes:
        a seat pad; and
        a seat cover individually covering the seat pad,
    a divided surface, at which a surface of the top main portion and a surface of one of the top side portions of the three divided cushions are tightly contact each other, includes:
        a first divided surface extending from a seat front side toward a seat back side; and
        a second divided surface that is bent from a seat back side extending tip of the first divided surface in a direction different from a direction in which the first divided surface extends and extends toward the seat back side,
    a top cover piece of the seat cover that is disposed over a seat surface includes:
        an extension portion that extends so as to cover the divided surface; and
        a sewn portion where the top cover piece is sewn with a divided surface cover piece covering the divided surface, the sewn portion being disposed on the divided surface between the top main portion and the one of the top side portions, and the surface of the top main portion and the surface of each of the top side portions are tightly contact each other at the second divided surface.

2. The seat device according to claim 1, wherein the first divided surface extends in a direction that rises in a thickness direction relative to the second divided surface, and the second divided surface is bent obliquely inward in the seat width direction.

3. The seat device according to claim 1, wherein the seat pad of each top side portion is made of urethane foam that is harder than the seat pad of the top main portion.

4. The seat device according to claim 1, wherein the three divided cushions form a seat back of the seat device.

5. The seat device according to claim 1, wherein the three divided cushions form a seat cushion of the seat device.

6. The seat device according to claim 1, wherein
the extension portion of the top cover piece is sewn with the divided surface cover piece at the sewn portion.

7. The seat device according to claim 1, wherein
the top cover piece includes a main cover piece covering the top main portion and a side cover piece covering each of the top side portions,
the divided surface cover piece includes a main piece covering the divided surface of the top main portion, and a side piece covering the divided surface of each of the top side portions,
the main cover piece and the main piece are sewn together, and
the side cover piece and the side piece are sewn together.

8. The seat device according to claim 1, wherein
the divided surface cover piece covers the divided surface on seat back side of the sewn portion.

9. The seat device according to claim 1, wherein
the divided surface cover piece covers the entire second divided surface such that the divided surface cover piece extends from the sewn portion on the first divided surface and extends to cover at least a portion of a seat back side surface of the top main portion and a portion of a seat back side surface of the top side portion.

10. The seat device according to claim 9, further comprising:
a first cover fixing groove provided on the seat back side surface of the top main portion and a second cover fixing groove provided on the seat back side surface of each of the top side portions,
an end of the divided surface cover piece covering the portion of the seat back side surface of the top main portion is inserted into the first cover fixing groove to fix the seat cover to the top main portion, and
an end of the divided surface cover piece covering the portion of the seat back side surface of each of the top side portion is inserted into the second cover fixing groove to fix the seat cover to the top side portion.

11. The seat device according to claim 1, wherein
at the divided surface, the seat pad and seat cover of the top main portion are tightly contact each other, the seat pad and the seat cover of one of the top side portions are tightly contact each other, and the seat cover of the top main portion and the seat cover of the one of the top side portions are tightly contact each other.

* * * * *